(12) United States Patent
Huh

(10) Patent No.: US 12,741,648 B2
(45) Date of Patent: Sep. 22, 2026

(54) VEHICLE CONTROL APPARATUS AND A METHOD THEREOF

(71) Applicants: HYUNDAI MOTOR COMPANY, Seoul (KR); KIA CORPORATION, Seoul (KR)

(72) Inventor: Jee Wook Huh, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 85 days.

(21) Appl. No.: 18/808,873

(22) Filed: Aug. 19, 2024

(65) Prior Publication Data

US 2026/0070557 A1 Mar. 12, 2026

(30) Foreign Application Priority Data

Nov. 1, 2023 (KR) ........................ 10-2023-0149231

(51) Int. Cl.

| | |
|---|---|
| ***B60W 30/182*** | (2020.01) |
| ***B60R 16/033*** | (2006.01) |
| ***B60W 40/08*** | (2012.01) |
| ***B60W 50/08*** | (2020.01) |
| ***G06V 20/59*** | (2022.01) |

(52) U.S. Cl.

CPC ......... *B60W 30/182* (2013.01); *B60R 16/033* (2013.01); *B60W 40/08* (2013.01); *B60W 50/082* (2013.01); *G06V 20/597* (2022.01); *B60W 2040/0827* (2013.01)

(58) Field of Classification Search

CPC .. B60W 30/182; B60W 40/08; B60W 50/082; B60W 2040/0827; G06V 20/597; B60R 16/033

See application file for complete search history.

(56) References Cited

U.S. PATENT DOCUMENTS

2022/0073092 A1 3/2022 Yuasa

FOREIGN PATENT DOCUMENTS

| | | | |
|---|---|---|---|
| EP | 3390131 | B1 | 5/2021 |
| KR | 100362104 | B1 | 3/2003 |
| KR | 101996821 | B1 | 7/2019 |
| KR | 102200808 | B1 | 1/2021 |
| KR | 20230064644 | A | 5/2023 |

OTHER PUBLICATIONS

Extended European Search Report cited in patent application No. 24197623.2-1009; Feb. 21, 2025; 9 pp.

*Primary Examiner* — Aryan E Weisenfeld
(74) *Attorney, Agent, or Firm* — Lempia Summerfield Katz LLC

(57) ABSTRACT

A vehicle control apparatus for a rest in a vehicle and a method thereof are provided. The vehicle control apparatus includes a detector that obtains user information and a processor connected to the detector. The processor determines a user state based on the user information obtained by the detector while a vehicle is traveling. The processor determines whether a rest mode entry condition is satisfied based on the user state. The processor determines an in-vehicle rest mode based on a user input received from a user interface, in response to a determination that the rest mode entry condition is satisfied. The processor performs vehicle control corresponding to the in-vehicle rest mode.

19 Claims, 10 Drawing Sheets

VEHICLE CONTROL APPARATUS AND A METHOD THEREOF

CROSS-REFERENCE TO RELATED APPLICATION

This application claims the benefit of and the priority to Korean Patent Application No. 10-2023-0149231, filed in the Korean Intellectual Property Office on Nov. 1, 2023, the entire contents of which are incorporated herein by reference.

TECHNICAL FIELD

The present disclosure relates to a vehicle control apparatus for a rest in a vehicle and a method thereof.

BACKGROUND

As an autonomous driving technology is developed, a driver is able to rest in a vehicle. Thus, an existing technology is focused on a new technology or information technology (IT) for providing an environment in which the driver is able to rest in the vehicle while driving. Technology development through vehicle control is not performed.

An existing vehicle control technology is developed by focusing on improving fuel efficiency and/or drivability. In addition, an electronics control technology for ensuring a battery state of charge (SOC) is optimized only in a specific situation such as a charging situation.

Such a vehicle control technology may interfere with the rest of a passenger in the vehicle, when the passenger rests in the vehicle. For example, noise and vibration, which are generated due to engine on and off repetition, may disturb the sleep of the passenger, when the passenger sleeps in the vehicle.

SUMMARY

The present disclosure has been made to solve the above-mentioned problems occurring in the prior art while advantages achieved by the prior art are maintained intact.

An aspect of the present disclosure provides a vehicle control apparatus for controlling a vehicle to minimize a factor, which impedes the rest of the user in the vehicle and provides a method thereof.

Another aspect of the present disclosure provides a vehicle control apparatus for controlling a vehicle to induce a passenger to rest and provides a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a vehicle control apparatus may include a detector that obtains user information and a processor connected to the detector. The processor may determine a user state based on the user information obtained by the detector while a vehicle is traveling. The processor may determine whether a rest mode entry condition is satisfied based on the user state. The processor may determine an in-vehicle rest mode based on a user input received from a user interface, in response to a determination that the rest mode entry condition is satisfied. The processor may perform vehicle control corresponding to the in-vehicle rest mode.

The processor may analyze an image captured by a camera to determine fatigue of a user and may determine whether the user needs to rest based on the fatigue of the user.

The processor may analyze a brain wave signal measured by a brain wave sensor to determine fatigue of a user and may determine whether the user needs to rest based on the fatigue of the user.

The processor may select and turn on an essential controller for electronics load optimization when entering the in-vehicle rest mode. The processor may turn off remaining controllers except for the essential controller among controllers loaded into a vehicle.

The in-vehicle rest mode may be divided into a while-driving-rest mode and an after-parking-rest mode based on a rest mode entry time point.

The processor may downwardly adjust an output voltage of a low voltage DC-DC converter to suppress power consumption of a high voltage battery, in response to a determination the in-vehicle rest mode is a while-driving-rest mode.

The processor may upwardly adjust an optimal state of charge (SOC) area determined with regard to efficiency of the high voltage battery. The processor may downwardly adjust a reference SOC being a determination criterion for determining whether idle charging is performed. The processor may limit turning-on of an engine for learning executed while the vehicle is operating.

The processor may limit operation of a heater, in response to a determination that a condenser temperature decreases to or below a predetermined temperature when an air conditioner operates. The processor may limit an amount of change in power of an air conditioner compressor.

The processor may perform heating by using an electrical heating element, when a heater operates, and may limit heating performed by an engine.

The processor may enter a preparation mode for entering an after-parking-rest mode, in response to a determination that the in-vehicle rest mode is the after-parking-rest mode. The processor may upwardly adjust an output voltage of a low voltage DC-DC converter to charge a low voltage battery by using a high voltage battery.

The processor may upwardly adjust a reference SOC being a determination criterion for determining whether idle charging is performed. The processor may induce engine-on to charge the high voltage battery, in response to a determination that an SOC of the high voltage battery is less than a target SOC.

The processor may adjust a target temperature to be lower than a predetermined setting temperature, when an air conditioner operates.

The processor may stop heating performed by an electrical heating element, when a heater operates. The processor may close an active air flap (AAF) to minimize cooling of an engine coolant. The processor may upwardly adjust a target coolant temperature to turn on an engine.

The processor may determine whether the vehicle arrives at a predetermined resting place. The processor may enter the after-parking-rest mode, in response to a determination that the vehicle arrives at the predetermined resting place. The processor may downwardly adjust an output voltage of a low voltage DC-DC converter. The processor may downwardly adjust a reference SOC being a determination criterion for determining whether idle charging is performed. The processor may limit turning-on of an engine for learning executed while the vehicle is operating.

The processor may limit operation of a heater, in response to a determination that a condenser temperature decreases to or below a predetermined temperature, when an air conditioner operates. The processor may upwardly adjust an indoor temperature of the vehicle.

The processor may perform heating by using an electrical heating element, when a heater operates. The processor may close an AAF to minimize cooling of an engine coolant. The processor may determine whether an indoor temperature of the vehicle is less than a predetermined appropriate resting temperature. The processor may turn on an engine to perform heating, in response to a determination that the indoor temperature of the vehicle is less than the predetermined appropriate resting temperature. The processor may turn off the engine, in response to a determination that the indoor temperature of the vehicle reaches the predetermined appropriate resting temperature.

According to another aspect of the present disclosure, a vehicle control method may include determining a user state based on user information obtained by a detector. The vehicle control method may include determining whether a rest mode entry condition is satisfied based on the user state. The vehicle control method may include determining an in-vehicle rest mode based on a user input received from a user interface, in response to a determination that the rest mode entry condition is satisfied. The vehicle control method may include performing vehicle control corresponding to the in-vehicle rest mode.

Determining the user state may include analyzing an image captured by a camera to determine fatigue of a user and may include determining whether the user needs to rest based on the fatigue of the user.

Determining the user state may include analyzing a brain wave signal measured by a brain wave sensor to determine fatigue of a user and may include determining whether the user needs to rest based on the fatigue of the user.

Performing the vehicle control corresponding to the in-vehicle rest mode may include selecting and turning on an essential controller for electronics load optimization and may include turning off remaining controllers except for the essential controller among controllers loaded into a vehicle.

Performing the vehicle control corresponding to the in-vehicle rest mode may include performing vehicle control for a while-driving rest, in response to a determination that the in-vehicle rest mode is a while-driving-rest mode.

Performing the vehicle control for the while-driving rest may include downwardly adjusting an output voltage of a low voltage DC-DC converter to suppress power consumption of a high voltage battery.

Performing the vehicle control for the while-driving rest may include upwardly adjusting an optimal SOC area determined with regard to efficiency of the high voltage battery. Performing the vehicle control for the while-driving rest may include downwardly adjusting a reference SOC being a determination criterion for determining whether idle charging is performed. Performing the vehicle control for the while-driving rest may include limiting turning-on of an engine for learning executed while a vehicle is operating.

Performing the vehicle control for the while-driving rest may include limiting operation of a heater, in response to a determination that a condenser temperature decreases to or below a predetermined temperature, when an air conditioner operates. Performing the vehicle control for the while-driving rest may include limiting an amount of change in power of an air conditioner compressor.

Performing the vehicle control for the while-driving rest may include performing heating by using an electrical heating element, when a heater operates, and performing heating by using an engine, only while the vehicle is traveling.

Performing the vehicle control corresponding to the in-vehicle rest mode may include performing vehicle control for preparing to enter an after-parking-rest mode, in response to a determination that the in-vehicle rest mode is the after-parking-rest mode. Performing the vehicle control corresponding to the in-vehicle rest mode may include determining whether a vehicle arrives at a resting place. Performing the vehicle control corresponding to the in-vehicle rest mode may include performing vehicle control for an after-parking-rest, in response to a determination that the vehicle arrives at the resting place.

Performing the vehicle control for preparing to enter the after-parking-rest mode may include upwardly adjusting an output voltage of a low voltage DC-DC converter to charge a low voltage battery using a high voltage battery, after entering a preparation mode for entering the after-parking-rest mode.

Performing the vehicle control for preparing to enter the after-parking-rest mode may include upwardly adjusting a reference SOC being a determination criterion for determining whether idle charging is performed. Performing the vehicle control for preparing to enter the after-parking-rest mode may include turning on an engine to charge a high voltage battery, in response to a determination that an SOC of the high voltage battery is less than a target SOC.

Performing the vehicle control for preparing to enter the after-parking-rest mode may include adjusting a target temperature to be lower than a predetermined setting temperature, when an air conditioner operates.

Performing the vehicle control for preparing to enter the after-parking-rest mode may include limiting heating performed by an electrical heating element, when a heater operates. Performing the vehicle control for preparing to enter the after-parking-rest mode may include closing an AAF to minimize cooling of an engine coolant. Performing the vehicle control for preparing to enter the after-parking-rest mode may include upwardly adjusting a target coolant temperature to turn on an engine.

Performing the vehicle control for the after-parking rest may include downwardly adjusting an output voltage of a low voltage DC-DC converter, when entering the after-parking-rest mode. Performing the vehicle control for the after-parking rest may include downwardly adjusting a reference SOC being a determination criterion for determining whether idle charging is performed. Performing the vehicle control for the after-parking rest may include limiting turning-on of an engine for learning executed while the vehicle is operating.

Performing the vehicle control for the after-parking-rest may include limiting operation of a heater, in response to a determination that a condenser temperature decreases to or below a predetermined temperature, when an air conditioner operates. Performing the vehicle control for the after-parking-rest may include upwardly adjusts an indoor temperature of the vehicle.

Performing the vehicle control for the after-parking rest may include performing heating by using an electrical heating element, when a heater operates. Performing the vehicle control for the after-parking rest may include closing an AAF to minimize cooling of an engine coolant. Performing the vehicle control for the after-parking rest may include determining whether an indoor temperature of the vehicle is less than a predetermined appropriate resting temperature. Performing the vehicle control for the after-parking rest may include turning on an engine to perform heating, in response to a determination that the indoor temperature of the vehicle is less than the predetermined appropriate resting temperature. Performing the vehicle control for the after-parking rest may include determining whether the indoor temperature of the vehicle reaches the predetermined appropriate resting temperature. Performing the vehicle control for the after-parking rest may include turning off the engine, in response to a determination that the indoor temperature of the vehicle reaches the predetermined appropriate resting temperature.

According to another aspect of the present disclosure, a vehicle control apparatus may include a user interface and a processor connected to the user interface. The processor may enter a rest mode based on a user input received from the user interface. The processor may determine an in-vehicle rest mode based on the user input. The processor may select and turn on an essential controller for electronics load optimization, when entering the determined in-vehicle rest mode. The processor may turn off remaining controllers except for the essential controller among controllers loaded into a vehicle. The processor may perform vehicle control corresponding to the determined in-vehicle rest mode.

The processor may downwardly adjust an output voltage of a low voltage DC-DC converter to suppress power consumption of a high voltage battery, in response to a determination that the in-vehicle rest mode is determined as a while-driving-rest mode. The processor may upwardly adjust an optimal SOC area determined with regard to efficiency of the high voltage battery. The processor may downwardly adjust a reference SOC being a determination criterion for determining whether idle charging is performed.

The processor may enter a preparation mode for entering an after-parking-rest mode, in response to a determination that the in-vehicle rest mode is the after-parking-rest mode. The processor may upwardly adjust an output voltage of a low voltage DC-DC converter to charge a low voltage battery using a high voltage battery. The processor may upwardly adjust a reference SOC being a determination criterion for determining whether idle charging is performed. The processor may induce engine-on to charge the high voltage battery, in response to a determination that an SOC of the high voltage battery is less than a target SOC.

The processor may enter an after-parking-rest mode, when the vehicle arrives at a predetermined resting place. The processor may downwardly adjust an output voltage of a low voltage DC-DC converter. The processor may downwardly adjust a reference SOC being a determination criterion for determining whether idle charging is performed. The processor may limit engine-on for learning executed while the vehicle is operating.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
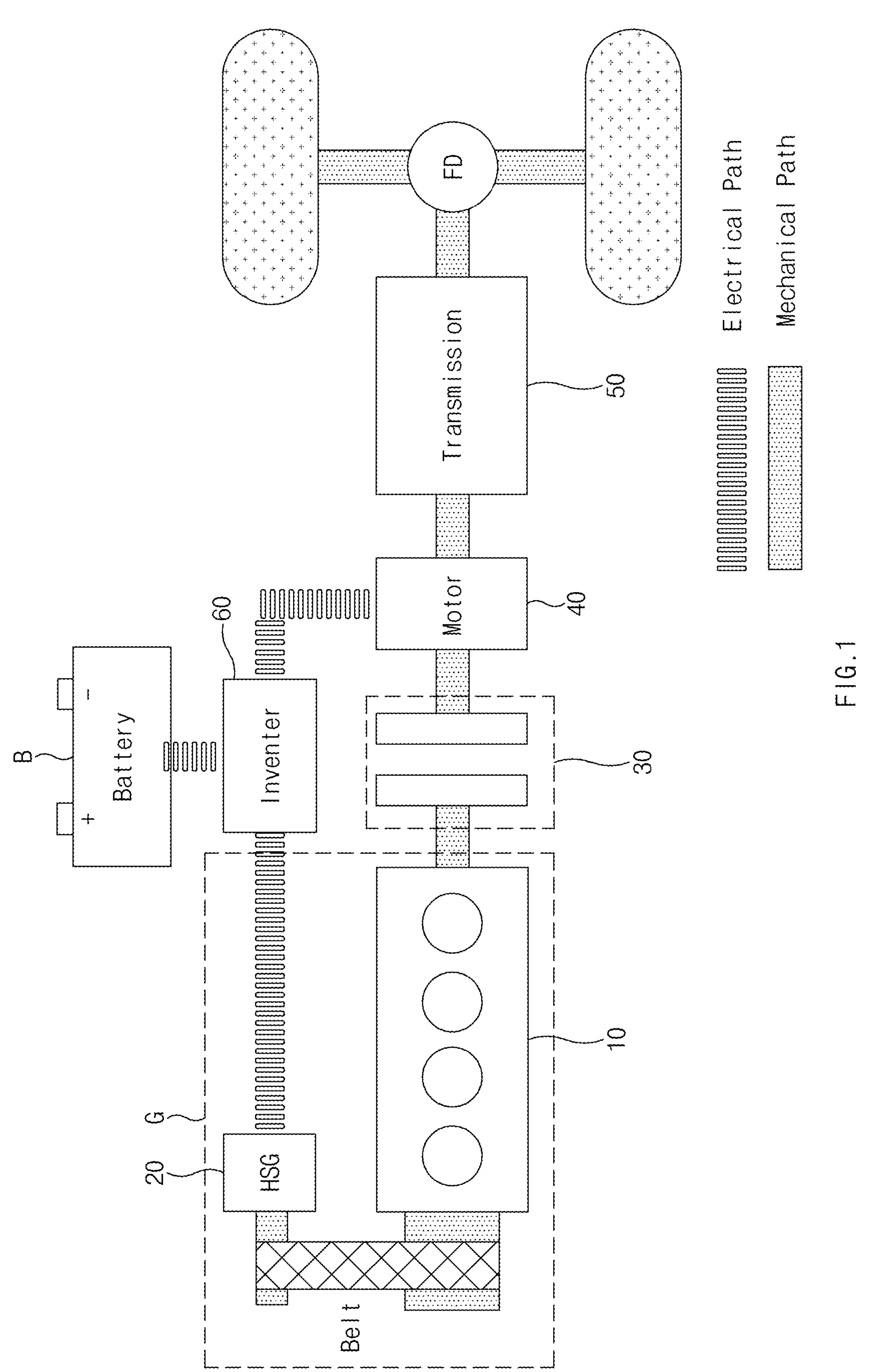
FIG. 1 is a drawing illustrating a configuration of a hybrid electric vehicle (HEV) associated with the present disclosure.

Hereinafter, some embodiments of the present disclosure are described in detail with reference to the drawings. It should be noted that when the reference numerals to the components of each drawing are added, the identical or equivalent component is designated by the identical numerals even when the components are displayed on other drawings. In addition, a detailed description of well-known features or functions has been omitted in order not to unnecessarily obscure the gist of the present disclosure.

In describing components of embodiments of the present disclosure, the terms first, second, A, B, (a), (b), and the like may be used herein. These terms are only used to distinguish one component from another component. However, the terms are not intended to limit the corresponding components irrespective of the order or priority of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary should be interpreted as having meanings equal to the contextual meanings in the relevant field of art. Such terms should not be interpreted as having ideal or excessively formal meanings unless clearly defined as having such in the present application. When a controller, module, component, device, element, or the like of the present disclosure is described as having a purpose or performing an operation, function, or the like, the controller, module, component, device, element, or the like should be considered herein as being “configured to” meet that purpose or to perform that operation or function. Each controller, module, component, device, element, and the like may separately embody or be included with a processor and a memory, such as a non-transitory computer readable media, as part of the apparatus.

FIG. 1 is a drawing illustrating a configuration of a hybrid electric vehicle (HEV) associated with the present disclosure.

The HEV may refer to a vehicle, which uses two different driving sources. In general, the HEV may use an engine for burning fuel (e.g., gasoline or the like) to generate a driving force and may use a motor for generating a driving force using electrical energy of the battery as driving sources.

Referring to FIG. 1, the HEV may include an engine 10, a hybrid starter generator (HSG) 20, an engine clutch 30, a motor 40, a transmission 50, and an inverter 60.

The engine 10 may burn fuel to generate electric power (or an engine torque) necessary to drive the vehicle. Various well-known engines such as a gasoline engine or a diesel engine may be used as the engine 10. The engine 10 may control an output torque (i.e., an engine torque) under a command of an engine management system (EMS).

The HSG 20 may be connected to the engine 10 by a belt. The HSG 20 may crank the engine 10 to start the engine 10. The HSG 20 may play a role in starting the engine 10 when an electric vehicle mode switches to a hybrid mode. The HSG 20 may operate as a generator, which generates electrical energy using electric power of the engine 10 in the state where the engine 10 is started. The electrical energy generated by the HSG 20 may be used to charge a battery B. The HSG 20 and the engine 10 may be collectively referred to as a plant G.

The engine clutch 30 may be disposed between the engine 10 and the motor 40 to turn on/off electric power (or an output torque) of the engine 10. The engine clutch 30 may transmit or block electric power (or an engine torque) generated by the engine 10 to drive wheels (or vehicle wheels) by being engaged or disengaged.

The motor 40 may receive power from the inverter 60 to generate electric power (or motor electric power) and may transmit the electric power to the drive wheels. The motor 40 may change a rotation direction and a revolution per minute (RPM) under an instruction of a motor control unit (MCU) to control an output torque (or a motor torque) of the motor 40. The motor 40 may be used as a generator, which generates a back electromotive force when a state of charge (SOC) is insufficient or upon regenerative braking and charges the battery B. The battery B may play a role in supplying power necessary for driving of the vehicle. Furthermore, the battery B may be charged by regenerative energy generated by the motor 40. A high voltage battery (or a high capacity battery) capable of outputting a predetermined high voltage (e.g., 400 V or more) may be applied as the battery B.

The transmission 50 may convert the motor torque or the engine torque and the motor torque into a transmission ratio matched with a transmission stage (or a gear stage). The transmission 50 may change a transmission stage under an instruction of a transmission control unit (TCU). The TCU may determine an optimal transmission stage based on information, such as a driving speed of the vehicle (i.e., a vehicle speed or a wheel speed), an accelerator pedal position, an engine RPM, and/or a clutch travel by means of sensors in the vehicle.

The inverter 60 may be a power converter disposed between the motor 40 and the battery B. The inverter 60 may convert power output from the battery B into motor drive power to supply the motor drive power to the motor 40. For example, the inverter 60 may convert a DC voltage output from the battery B into a 3-phase AC voltage necessary to drive the motor 40. The inverter 60 may adjust power (e.g., an output voltage) supplied to the motor 40 under an instruction of the MCU to control a motor torque. The present embodiment describes an example in which the inverter 60 is disposed between the motor 40 and the battery B but is not limited thereto. When the motor 40 applied to the vehicle is a DC motor, a converter may be disposed between the motor 40 and the battery B, or the motor 40 and the battery B may be directly connected to each other without using the power converter.

Figure 2:
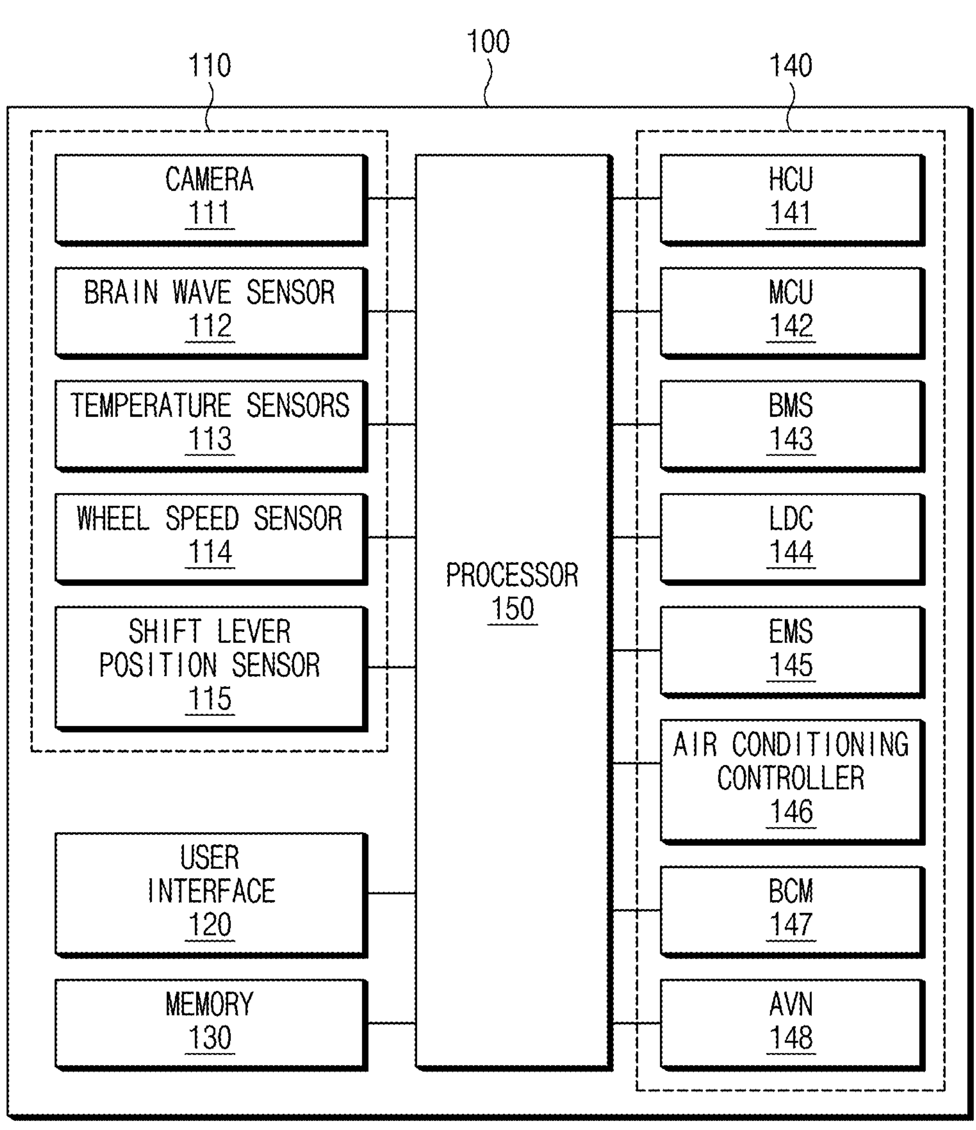
FIG. 2 is a block diagram illustrating a configuration of a vehicle control apparatus according to embodiments of the present disclosure.

FIG. 2 is a block diagram illustrating a configuration of a vehicle control apparatus according to embodiments of the present disclosure.

A vehicle control apparatus 100 may be loaded into a hybrid electric vehicle (HEV) capable of performing autonomous driving. Referring to FIG. 2, the vehicle control apparatus 100 may include a detector 110, a user interface 120, a memory 130, controllers 140, and a processor 150, which are connected through a vehicle network. The vehicle network may be implemented as a controller area network (CAN), a media oriented systems transport (MOST) network, a local interconnect network (LIN), an Ethernet, X-by-Wire (Flexray), and/or the like.

The detector 110 may sense (or obtain) information of a user (e.g., a driver, a passenger, or the like) who rides in the vehicle using a camera 111, a brain wave sensor 112, and/or the like. The detector 110 may capture the user using the camera 111 and may store the captured image in the memory 130. The camera 111 may include at least one of image sensors, such as a charge coupled device (CCD) image sensor, a complementary metal oxide semi-conductor (CMOS) image sensor, a charge priming device (CPD) image sensor, or a charge injection device (CID) image sensor. The camera 111 may include an image processor for performing image processing, such as noise cancellation, color reproduction, file compression, image quality adjustment, and saturation adjustment, for an image obtained by means of the image sensor. The detector 110 may measure (or detect) a brain wave signal of the user using the brain wave sensor 112. The brain wave sensor 112 may be composed of at least one electroencephalogram (EEG) sensor.

The detector 110 may measure a temperature at a specific point in the vehicle using temperature sensors 113 mounted on the vehicle. For example, the detector 110 may detect an indoor temperature of the vehicle using the temperature sensor mounted on the interior of the vehicle. Furthermore, the detector 110 may detect an engine coolant temperature (hereinafter referred to as a "coolant temperature") using the temperature sensor mounted on an engine coolant line.

The detector 110 may detect a driving state of the vehicle using vehicle sensors. The detector 110 may detect a driving speed of the vehicle, a shift lever position, and the like using a wheel speed sensor 114, a shift lever position sensor 115, and the like.

The detector 110 may store data (or information) obtained by the camera 111, the brain wave sensor 112, the temperature sensors 113, the wheel speed sensor 114, the shift lever position sensor 115, and/or the like in the memory 130. Furthermore, the detector 110 may directly transmit the data obtained by the camera 111, the brain wave sensor 112, the temperature sensors 113, the wheel speed sensor 114, the shift lever position sensor 115, and/or the like to the processor 150.

The user interface 120 may serve to help the vehicle control apparatus 100 and the user to interact with each other. The user interface device 120 may include an input device (e.g., a keyboard, a touch pad, a microphone, a touch screen, and/or the like) for generating data according to manipulation of the user, an output device (e.g., a display, a speaker, a tactile signal output device, and/or the like) for outputting information according to an operation of the vehicle control apparatus 100, and/or the like.

The user interface 120 may include a hardware button and/or a software button to which a function capable of selecting whether to enter a rest mode is allocated. When the button is manipulated by the user, the user interface 120 may output data (or a signal) corresponding to the manipulation of the button. For example, the user interface 120 may transmit data indicating that the rest mode is entered or that the rest mode is ended to the processor 150 based on the button manipulation of the user.

The memory 130 may be a non-transitory storage medium which stores instructions executed by the processor 150. The memory 130 may include at least one of storage media (or recording media) such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), or an erasable and programmable ROM (EPROM).

The memory 130 may store an in-vehicle rest control algorithm, an image analysis algorithm, a brain wave analysis algorithm, and/or the like. The memory 130 may store information (or setting information) preset by a system designer and/or the user. The memory 130 may store input data and/or output data of the processor 150.

The controllers 140 may operate based on data (or a control command) transmitted from the processor 150. Furthermore, the controllers 140 may obtain data (or information) requested by the processor 150 and may transmit the obtained data to the processor 150. The controllers 140 may transmit and receive data with each other.

The controllers 140 may include electronic control units, an electrical device (or an electronics load), and the like mounted on the vehicle. The electronic control units may include a hybrid control unit (HCU) 141, a motor control unit (MCU) 142, a battery management system (BMS) 143, a low voltage DC-DC converter (LDC) 144, an engine management system (EMS) 145, an air conditioning controller 146, a body control module (BCM) 147, and/or the like.

The HCU 141 may control the overall operation (e.g., motor start, idle stop, engine stop upon brake stop, or the like) of the vehicle. The MCU 142 may control a rotational direction, a rotational speed, and the like of the motor 40.

The BMS 143 may monitor SOCs, voltages, currents, temperatures, and/or the like of a high voltage battery and a low voltage battery. The BMS 143 may prevent the battery from being overcharged when charging the battery and may prevent the battery from being over-discharged when discharging the battery. Thus, an SOC of the battery may be managed.

The LDC 144 may convert a high voltage supplied from the high voltage battery into a low voltage to charge the low voltage battery. The high voltage battery may supply power necessary to drive the motor 40 of the vehicle. The low voltage battery may supply power necessary to operate an electronics load loaded into the vehicle. A 12V lithium battery or the like may be used as the low voltage battery.

The EMS 145 may be a system which controls and manages the engine 10, which may turn on (or operate) or turn off (or stop) the engine 10. The EMS 145 may control an output torque of the engine 10.

The air conditioning controller 146 may control an indoor temperature, humidity, air flow, air cleanliness, and/or the like of the vehicle. The air conditioning controller 146 may compare the indoor temperature of the vehicle, which is measured by the temperature sensors 113, with a predetermined setting temperature and may control an operation of an air conditioner or a heater based on the compared result.

The BCM 147 may control a function such as door lock, an ambient light, an outdoor light, wipers, a direction indicator, power management, and/or the like of the vehicle.

The electrical device may refer to an electronics load using electrical energy in the vehicle. The electrical device may include audio, video, navigation (AVN) 148, an ambient light, a cluster, and/or the like.

The processor 150 may control the overall operation of the vehicle control apparatus 100. The processor 150 may be implemented as at least one of an application specific integrated circuit (ASIC), a digital signal processor (DSP), programmable logic devices (PLD), field programmable gate arrays (FPGAs), a central processing unit (CPU), microcontrollers, or microprocessors.

The processor 150 may perform vehicle control based on predetermined control logic such that the user riding in the vehicle takes a while-driving rest or takes an after-parking rest. The rest may include reading, listening to the radio, listening to music, sleep (or deep sleep), and/or the like.

While the vehicle is traveling, the processor 150 may sense (or recognize) a state (or a user state) of the user who rides in the vehicle, using the camera 111, the brain wave sensor 112, and/or the like. The processor 150 may analyze the image captured by the camera 111 (e.g., analyze a face feature) to recognize the fatigue of the user. Furthermore, the processor 150 may analyze the brain wave signal measured by the brain wave sensor 112 to determine (or recognize) the fatigue of the user.

The processor 150 may determine whether a rest mode entry condition is met based on the user state. The processor 150 may recognize a state of the user (e.g., a driver, a passenger, or the like) using the camera 111, the brain wave sensor 112, and/or the like mounted on the vehicle. The processor 150 may determine whether the user needs to rest, based on the recognized state of the user (or the recognized user state). For example, when the fatigue of the user, which is recognized by the camera 111, the brain wave sensor 112, and/or the like, is greater than a predetermined reference value, the processor 150 may determine that the user needs to rest. For example, when the fatigue of the user, which is recognized by the camera 111, the brain wave sensor 112, and/or the like, is less than or equal to the predetermined reference value, the processor 150 may determine that the user does not need to rest. When it is determined that the user needs to rest, the processor 150 may determine that the rest mode entry condition is satisfied (or met). Meanwhile, when it is determined that the user does not need to rest, the processor 150 may determine that the rest mode entry condition is not satisfied.

When it is determined that the rest mode entry condition is satisfied, the processor 150 may determine whether the user agrees to enter the rest mode. The processor 150 may output a message for querying whether the user agrees to enter the rest mode through the user interface 120. When the user identifies the query message output through the user interface 120 and enters whether he or she agrees to enter the rest mode, the processor 150 may receive data according to a user input transmitted from the user interface 120. When the received data includes information indicating that the user agrees to enter the rest mode, the processor 150 may determine that the user agrees to enter the rest mode. When the received data includes information indicating that the user does not agree to enter the rest mode, the processor 150 may determine that the user does not agree to enter the rest mode.

When it is determined that the rest mode entry condition is not met, the processor 150 may determine whether the user selects to enter the rest mode. The processor 150 may identify whether data (or a control command) for instructing to enter the rest mode is received from the user interface 120.

When it is identified that the data for instructing to enter the rest mode is received from the user interface 120, the processor 150 may determine that the user selects to enter the rest mode. Meanwhile, when it is identified that the data for instructing to enter the rest mode is not received from the user interface 120, the processor 150 may determine that the user does not select to enter the rest mode.

When it is determined that the user agrees to enter the rest mode or when it is determined that the user selects to enter the rest mode, the processor 150 may determine to enter an in-vehicle rest mode based on the user input (or the user selection). The in-vehicle rest mode may be divided into a while-driving-rest mode, an after-parking-rest mode, and the like based on a rest mode entry time point.

When it is determined to enter the while-driving-rest mode in the in-vehicle rest mode, the processor 150 may perform vehicle control for a while-driving rest. After entering the while-driving-rest mode, the processor 150 may perform vehicle control such as electronics load optimization control, engine on or off control, and/or SOC control.

The processor 150 may perform vehicle control for the while-driving rest and may determine whether to end the rest mode. The processor 150 may perform vehicle control for the while-driving rest and may recognize a user state using the camera 111, the brain wave sensor 112, and/or the like. The processor 150 may determine whether to end the rest mode based on the recognized user state. For example, when the fatigue of the user, which is recognized by the camera 111, the brain wave sensor 112, and/or the like, is less than or equal to the predetermined reference value, the processor 150 may determine to end the rest mode. Furthermore, when a control command to instruct to end the rest mode is received from the user interface 120, the processor 150 may determine to end the rest mode. When it is determined to end the rest mode, the processor 150 may perform vehicle control for the while-driving rest.

When it is determined to enter the after-parking-rest mode in the in-vehicle rest mode, the processor 150 may recommend an available parking place. The processor 150 may search for an available parking place with regard to a current location and a driving route of the vehicle by means of the AVN 148 and may recommend the found available parking place as a candidate resting place. The available parking place may be a resting space when the user is able to take an after-parking rest, for example, a sleep shelter and/or a rest area.

The processor 150 may select any one of the recommended candidate resting places and may set the selected candidate resting place to a resting place. For example, the processor 150 may determine a resting space closest to the current location of the vehicle among resting spaces located on the driving route of the vehicle as a resting place. The processor 150 may set a resting place selected by the user to a destination using the AVN 148. Furthermore, the processor 150 may set a resting place based on the user input received from the user interface 120.

While the vehicle is traveling by setting the resting place to the destination, the processor 150 may perform vehicle control for preparing to enter the after-parking-rest mode. After entering the preparation mode for entering the after-parking-rest mode, the processor 150 may perform vehicle control such as electronics load optimization control, air conditioning control, and/or SOC control.

The processor 150 may determine whether the vehicle arrives at the resting place using the AVN 148. The AVN 148 may calculate a current location of the vehicle using a signal transmitted from a satellite. The AVN 148 may compare the calculated current location of the vehicle with a location of the resting place set to the destination to determine whether the vehicle arrives at the resting place. The AVN 148 may transmit the result of determining whether the vehicle arrives at the resting place to the processor 150. The processor 150 may determine whether the vehicle arrives at the resting place based on the determined result transmitted from the AVN 148.

When it is determined that the vehicle arrives at the resting place, the processor 150 may determine whether the vehicle is in a parking state. The processor 150 may determine whether the vehicle is parked based on a vehicle speed, a shift lever position, and/or the like. For example, when the vehicle is stopped as the vehicle speed is 0 km/h and when the shift lever position is the P-stage, the processor 150 may determine that the vehicle is parked. Furthermore, the processor 150 may obtain a surrounding image of the vehicle using the camera 111 and may analyze the obtained image to determine whether the vehicle is parked in the parking area. When the vehicle is parked in the parking area, the processor 150 may determine that the vehicle is parked.

While it is determined that the vehicle is parked, the processor 150 may enter the after-parking-rest mode and may perform vehicle control for a rest. After entering the after-parking-rest mode, the processor 150 may perform vehicle control such as electronics load optimization control, SOC control, and/or engine on and off optimization control.

The processor 150 may perform vehicle control for the after-parking rest and may determine whether the rest is ended. For example, the processor 150 may determine a user state by means of an analysis of an image and/or a brain wave obtained by the camera 111, the brain wave sensor 112, and/or the like. The processor 150 may determine whether the rest is ended based on the determined user state. For example, when the user state switches from a sleep state to a wake-up state, the processor 150 may determine that the rest is ended. When it is determined to end the rest, the processor 150 may end the vehicle control for the after-parking rest.

Hereinafter, a description is given in detail of the vehicle control method according to in-vehicle rest mode entry.

First of all, a description is given of vehicle control when the while-driving-rest mode is entered. When entering the while-driving-rest mode, the processor 150 may perform electronics load optimization control. In detail, the processor 150 may select an essential controller for electronics load optimization and may turn off (or stop) the remaining controllers except for the selected essential controller among the controllers 140 loaded into the vehicle. The essential controller may be a controller required to provide a resting environment while driving, which may be determined by the system designer. For example, the processor 150 may select controllers, such as the HCU 141, the MCU 142, the BMS 143, the LDC 144, the EMS 145, the air conditioning controller 146, the BCM 147, and the AVN 148, as essential controllers for a while-driving rest. The processor 150 may turn on (or operate) only the selected essential controllers and may turn off (or stop) an unnecessary electrical device (or electronics), such as a cluster, except for the essential controllers. It is described that the essential controller according to the in-vehicle rest mode is predetermined by the system designer in the present embodiment. However, it may be implemented that the processor 150 directly selects an essential controller among the controllers based on a selection criterion predetermined by the system designer.

Furthermore, the processor 150 may downwardly adjust an output voltage of the LDC 144 for electronics load optimization. The processor 150 may transmit a command to instruct to drive at low power to the LDC 144. The LDC 144 may drive at low power of a degree to which the state of the low voltage battery is able to be maintained at a predetermined certain level under an instruction of the processor 150 and may perform SOC defense control of the high voltage battery. When the voltage of the low voltage battery has a normal level (e.g., typically 12.1 V or more), the LDC 144 may perform SOC defense control in which the high voltage battery is not used to a maximum.

When entering the while-driving-rest mode, the processor 150 may perform engine one and off optimization control. In detail, after entering the while-driving-rest mode, the processor 150 may use heater mixing control to a minimum when operating the air conditioner to suppress engine-on (e.g., turning-on of the engine). The heater mixing control may be defined as operating and controlling the heater when the condenser temperature decreases to a predetermined temperature or less when operating the air conditioner.

The processor 150 may limit an amount of change in power of an air conditioner compressor. The processor 150 may limit the amount of change in power of the air conditioner compressor to a predetermined limit value to reduce an air conditioner load. For example, the processor 150 may limit the amount of change in power (or an amount of fluctuation in power) of the air conditioner compressor to 10 W/100 ms. The processor 150 may minimize power consumption of the high voltage battery (or an air conditioner power loss) by limiting the amount of change in power of the air conditioner compressor.

Furthermore, although the indoor temperature of the vehicle does not reach the setting temperature when operating the heater after entering the while-driving-rest mode, the processor 150 may adjust the indoor temperature of the vehicle by using an electrical heating element without turning on the engine 10. A positive temperature coefficient (PTC) heater or the like may be used as the electrical heating element. Furthermore, although a coolant temperature decreases to less than a predetermined reference water temperature while stopped, the processor 150 may suppress engine-on and may turn on the engine 10 while driving, thus ensuring a heat source.

Furthermore, after entering the while-driving-rest mode, the processor 150 may prohibit engine-on for learning. The processor 150 may limit an engine operation for engine learning, engine clutch learning, and/or the like which are/is executed when the vehicle is stopped or while an electric vehicle (EV) is driving. The processor 150 may limit learning in the while-driving-rest mode and may perform learning in a next drive cycle. Because the processor 150 prohibits control for turning on the engine 10 for learning while stopped in the while-driving-rest mode, it may suppress vehicle vibration and noise due to engine-on in the stop state.

After entering the while-driving-rest mode, the processor 150 may perform SOC control. In detail, the processor 150 may downwardly adjust a reference SOC for determining whether idle charging is performed to minimize that the engine 10 is turned on due to being idle (or idling).

Furthermore, the processor 150 may limit an amount of change (or an amount of fluctuation) in power of the air conditioner compressor to a predetermined limit (e.g., 10 W/100 ms). Because the processor 150 downwardly adjusts the amount of change in power of the air conditioner compressor, it may minimize power consumption of the high voltage battery, which is caused by the air conditioner.

Furthermore, the processor 150 may upwardly adjust an optimal SOC area (or range) to prevent the engine 10 from being turned on (or started) while stopped or when driving at a low speed. The optimal SOC area may be defined as an area where the high voltage battery is able to achieve optimal efficiency. Because the processor 150 upwardly adjusts the optimal SOC area of the high voltage battery, it may suppress that the engine 10 is turned on although the power of the high voltage battery is consumed.

Next, a description is given of vehicle control when the preparation mode for entering the after-parking-rest mode is entered.

The processor 150 may select an essential controller for maintaining the preparation mode for entering the after-parking-rest mode. In other words, the processor 150 may select an essential controller essentially required to maintain the preparation mode (or a preparation environment) for entering the after-parking-rest mode.

The processor 150 may turn on (or operate) the selected essential controller and may turn off (or stop) the remaining controllers, which are not selected as the essential controllers among the controllers 140 loaded into the vehicle. For example, the processor 150 may turn off an unnecessary electrical device (or electronics load), such as a cluster, a head up display (HUD), and/or an ambient light, except for essential controllers, such as the HCU 141, the MCU 142, the BMS 143, the LDC 144, the EMS 145, an air conditioning controller 146, the BCM 147, and the AVN 148.

The processor 150 may upwardly adjust an output voltage of the LDC 144. The LDC 144 may drive at high power and may charge the low voltage battery to a maximum to maintain the SOC of the low voltage battery at a predetermined reference level or more when parking under an instruction of the processor 150.

The processor 150 may downwardly adjust a target temperature when operating (or using) the air conditioner. At this time, the processor 150 may adjust a target temperature of the air conditioner to be lower than a temperature set by the user. As a result, the processor 150 may sufficiently cool the interior of the vehicle such that the user does not feel hot when resting (or sleeping) and may minimize air conditioner usage after parking. Thus, the SOC of the high voltage battery may be ensured.

The processor 150 may stop heating performed by the electrical heating element when operating the heater. In other words, the processor 150 may minimize the use of the PTC heater to minimize power consumption of the electronics load.

The processor 150 may upwardly adjust a target coolant temperature to induce engine-on. When the coolant temperature decreases, control for turning on the engine 10 to increase the coolant temperature is required. However, turning on the engine 10 while the user rests (e.g., sleeps) is able to disturb the rest of the user, the processor 150 may increase the target coolant temperature to induce the engine-on to sufficiently ensure a coolant temperature before parking.

The processor 150 may close an active air flap (AAF) to minimize cooling of a coolant. The AAF may be a device which manages the heat of an engine room. When the coolant temperature increases, the AAF may be open to increase the cooling efficiency of the coolant through air suction. When the coolant temperature decreases, the AAF may be closed to reduce air resistance to increase fuel efficiency.

The processor 150 may upwardly adjust an idle charging reference SOC $SOC_{IDLE}$. Because the processor 150 upwardly adjusts the reference SOC $SOC_{IDLE}$, which is a determination criterion for determining whether idle charging is performed to induce the engine-on, it may minimize that the SOC of the high voltage battery is reduced. The idle charging may be defined as a mode for operating the engine 10 and charging the high voltage battery to maintain the SOC of the high voltage battery as the reference SOC or more when the SOC of the high voltage battery is less than the reference SOC.

The processor 150 may perform target SOC control. When the battery SOC does not reach the target SOC by means of the target SOC control, the processor 150 may induce the engine-on and may charge the battery by means of low SOC area control. The low SOC area control may be defined as control for allowing the engine 10 to actively intervene such that the battery SOC reaches the optimal SOC area, when the battery is discharged in a situation where the battery SOC is a low area L.

Because the vehicle control in the preparation mode for entering the after-parking-rest mode is to increase the SOC of the high voltage battery and the low voltage battery and perform air conditioning control for pleasant resting environment, it may be to maintain an optimal resting state when entering the after-parking-rest mode.

Next, a description is given of vehicle control when the after-parking-rest mode is entered.

In other words, the processor 150 may select an essential controller essentially required to maintain an environment in the after-parking-rest mode (or a resting environment after parking). The processor 150 may turn on (or operate) only the selected essential controller. The processor 150 may turn off (or stop) the remaining controllers, which are not selected as the essential controllers among the controllers 140 loaded into the vehicle. For example, the processor 150 may turn off an unnecessary electrical device, such as the cluster, the AVN 148, and the ambient light, except for the essential controllers, such as the HCU 141, the MCU 142, the BMS 143, the LDC 144, the EMS 145, the air conditioning controller 146, and the BCM 147.

The processor 150 may downwardly adjust an output voltage of the LDC 144. The LDC 144 may drive at low power of a degree to which the state of the low voltage battery is able to be maintained at a predetermined certain level under an instruction of the processor 150 and may perform SOC defense control of the high voltage battery. When the voltage of the low voltage battery has a normal level (e.g., typically 12.1 V or more), the LDC 144 may perform SOC defense control in which the high voltage battery is not used to a maximum.

The processor 150 may downwardly adjust an idle charging reference SOC $SOC_{IDLE}$. The processor 150 may downwardly adjust the reference SOC $SOC_{IDLE}$, which is a determination criterion for determining whether idle charging is performed to minimize that the engine 10 is turned on due to being idle.

The processor 150 may prohibit engine-on for learning. The processor 150 may limit an engine operation for engine learning, engine clutch learning, and/or the like which are/is executed when the vehicle is stopped or while an EV is driving. The processor 150 may limit learning in the while-driving-rest mode and may perform learning in a next drive cycle. Because the processor 150 prohibits control for turning on the engine 10 for learning while stopped in the while-driving-rest mode, it may suppress vehicle vibration and noise due to engine-on in the stop state.

The processor 150 may not use heater mixing control when operating the air conditioner. The heater mixing control may refer to operating and controlling of the heater when the condenser temperature decreases to the predetermined temperature or less when operating the air conditioner. Although the air conditioner is operating in the while-driving-rest mode and the condenser temperature decreases to the predetermined temperature or less, the processor 150 may control the air conditioning controller 146 to minimize the heater mixing control and may suppress engine-on. Because the user slowly recognizes a change in temperature in the resting state (e.g., a sleep state), there may be less need to perform fast temperature control.

The processor 150 may upwardly adjust an indoor temperature of the vehicle with regard to a decrease in body temperature during rest.

The processor 150 may adjust an indoor temperature of the vehicle by using the electrical heating element when operating the heater. Although the indoor temperature of the vehicle is less than a setting temperature, the processor 150 may provide heating by maximally using the electrical heating element such as a positive temperature coefficient (PTC) heater. Furthermore, although the coolant temperature decreases while stopped, the processor 150 may suppress engine-on and may ensure a heat source by means of engine-on while driving. The processor 150 may close the active air flap (AAF) to minimize cooling of the coolant.

The processor 150 may determine whether the current indoor temperature is less than a predetermined appropriate resting temperature. The processor 150 may measure the current indoor temperature of the vehicle using the temperature sensors 113 and may compare the measured current indoor temperature with the appropriate resting temperature. When it is determined that the current indoor temperature is less than the predetermined appropriate resting temperature, the processor 150 may perform engine-on control. When the current indoor temperature is less than the predetermined appropriate resting temperature, the processor 150 may turn on the engine 10 to provide heating to the interior of the vehicle.

The processor 150 may determine whether the current indoor temperature reaches the appropriate resting temperature. The processor 150 may compare the current indoor temperature with an "appropriate resting temperature+$\alpha$". When the current indoor temperature is identical to the "appropriate resting temperature+$\alpha$" as a result of the comparison, the processor 150 may determine that the current indoor temperature reaches the appropriate resting temperature. A tolerance range may be hysteresis, which may be determined at a level of 10% of the appropriate resting temperature. When it is determined that the current indoor temperature reaches the appropriate resting temperature, the processor 150 may perform engine-off control. In other words, when the current indoor temperature reaches the appropriate resting temperature, the processor 150 may turn off the engine 10.

The vehicle control in the after-parking-rest mode is to control the vehicle in an optimal state to rest while minimizing a factor, which hinders a passenger from resting by means of optimal control for rest, which may prevent air conditioning control and engine-on.

Figure 3A:
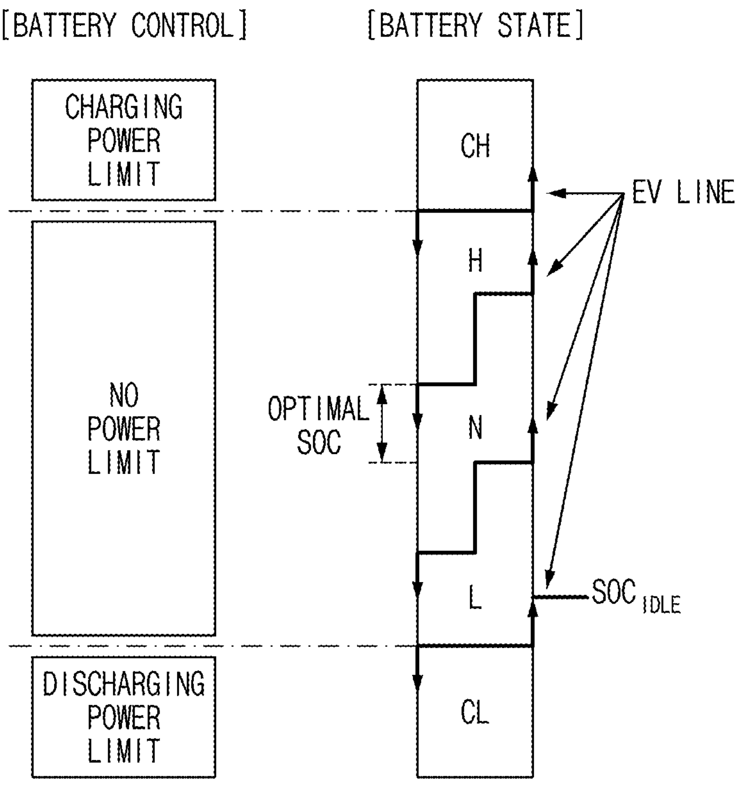
FIG. 3A is a drawing for describing battery state of charge (SOC) control upon normal driving associated with the present disclosure.
Figure 3B:
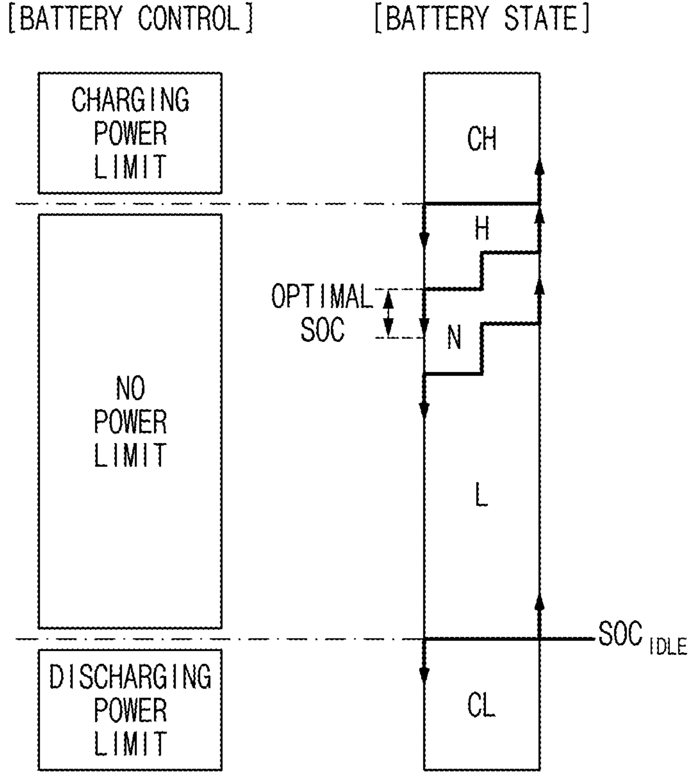
FIG. 3B is a drawing for describing battery SOC control in a while-driving-rest mode according to embodiments of the present disclosure.
Figure 3C:
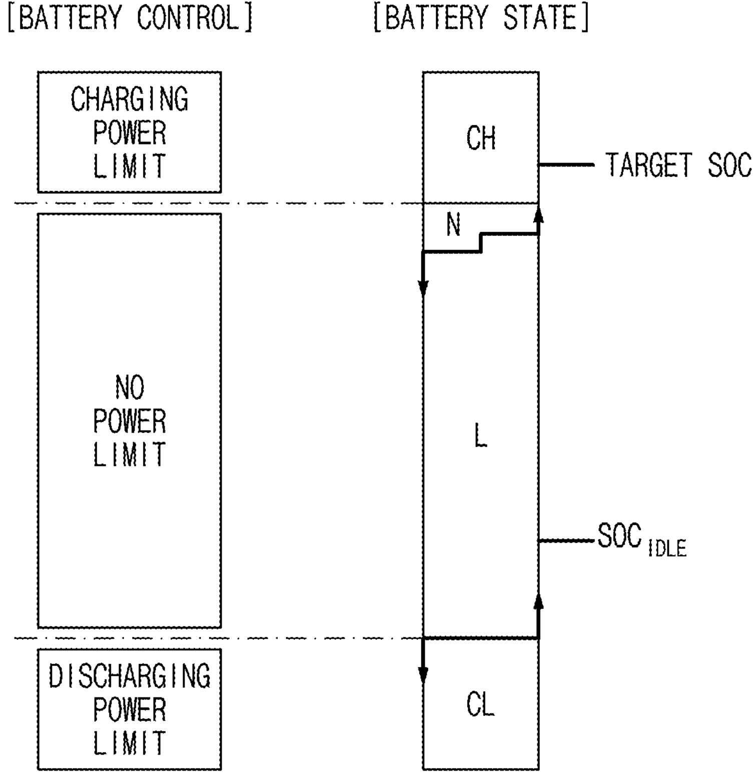
FIG. 3C is a drawing for describing battery SOC control in a preparation mode for entering an after-parking-rest mode according to embodiments of the present disclosure.

FIG. 3A is a drawing for describing battery SOC control upon normal driving associated with the present disclosure. FIG. 3B is a drawing for describing battery SOC control in a while-driving-rest mode according to embodiments of the present disclosure. FIG. 3C is a drawing for describing battery SOC control in a preparation mode for entering an after-parking-rest mode according to embodiments of the present disclosure.

Referring to FIGS. 3A to 3C, a battery SOC area may be divided into a critical high area (CH), a high area (H), a normal area (N), a low area (L), and a critical low area (CL). An optimal SOC area may be predetermined by a system designer, which may be an area having good efficiency of the vehicle and may defend the battery SOC from being located in the low area L.

Referring to FIG. 3A, upon normal driving, when the battery SOC is located in the critical high area (CH), a BMS 143 may limit battery charging power. In other words, when the battery SOC belongs to the critical high area (CH), the BMS 143 may limit battery charging. When the battery SOC is located in the critical low area CL, the BMS 143 may limit discharging power of the battery, i.e., battery discharging.

When the battery SOC is located in the high area H, the normal area N, or the low area L, the BMS 143 may not limit battery charging power and battery discharging power. When the battery SOC is located in the high area H, the BMS 143 may allow a vehicle to drive in an EV mode to consume battery power. When the battery SOC is located in the low area L, the BMS 143 may turn on an engine 10 to charge the battery (or a high voltage battery). The BMS 143 may perform battery operation based on a predetermined battery operation strategy such that the battery SOC is located in the optimal SOC area (e.g., 60% to 65%).

Referring to FIG. 3B, the BMS 143 may downwardly adjust an idle charging reference SOC $SOC_{IDLE}$ compared to upon normal driving when entering a while-driving-rest mode. As the idle charging reference SOC $SOC_{IDLE}$ is downwardly adjusted, the BMS 143 may minimize engine-on due to being idle (or idling).

Furthermore, the BMS 143 may upwardly adjust the optimal SOC area compared to upon normal driving to suppress (or limit) that the engine 10 is turned on while stopped or when driving at a low speed. At this time, the BMS 143 may upwardly adjust the optimal SOC area to a predetermined range. Although battery power is consumed as the optimal SOC area is upwardly adjusted, engine-on may be suppressed. Furthermore, the BMS 143 may decrease hysteresis of the battery to perform battery operation such that the battery SOC is maintained in an SOC area considering battery efficiency while maintaining the battery SOC as an SOC as high as possible.

Referring to FIG. 3C, the BMS 143 may upwardly adjust the idle charging reference SOC $SOC_{IDLE}$ compared to upon normal driving when entering a preparation mode for entering an after-parking-rest mode. The BMS 143 may upwardly adjust the idle charging reference SOC $SOC_{IDLE}$ to induce engine-on and thus may minimize the discharged battery. Furthermore, when the battery SOC does not reach a target SOC by means of target SOC control, the BMS 143 may induce the engine-on and may charge the battery by means of low SOC area control. The low SOC area control may be defined as control for allowing the engine 10 to actively intervene such that the battery SOC reaches the optimal SOC area, when the battery is discharged in a situation where the battery SOC is in the low area L.

Figure 4:
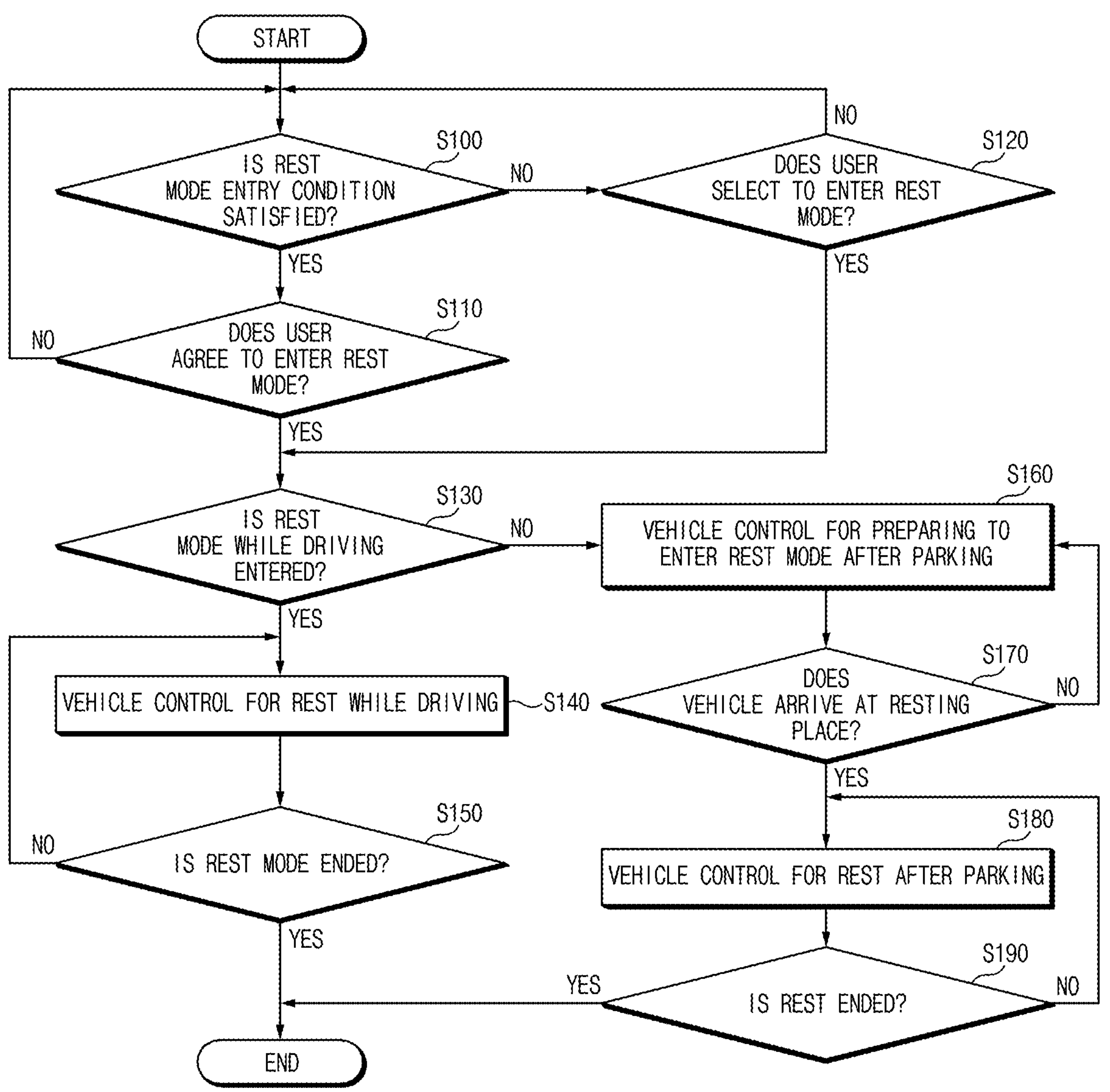
FIG. 4 is a flowchart illustrating a vehicle control method according to embodiments of the present disclosure.

FIG. 4 is a flowchart illustrating a vehicle control method according to embodiments of the present disclosure.

In S100, a processor 150 of a vehicle control apparatus 100 may determine whether a rest mode entry condition is met based on a user state while driving. The processor 150 may recognize a state of a user (e.g., a driver, a passenger, or the like) using a camera 111, a brain wave sensor 112, and/or the like mounted on the vehicle. The processor 150 may determine whether the user needs to rest based on the recognized state of the user. For example, when the fatigue of the user, which is recognized by the camera 111, the brain wave sensor 112, and/or the like, is greater than a predetermined reference value, the processor 150 may determine that the user needs to rest. For example, when the fatigue of the user, which is recognized by the camera 111, the brain wave sensor 112, and/or the like, is less than or equal to the predetermined reference value, the processor 150 may determine that the user does not need to rest. When it is determined that the user needs to rest, the processor 150 may determine that the rest mode entry condition is met. Meanwhile, when it is determined that the user does not need to rest, the processor 150 may determine that the rest mode entry condition is not met.

When it is determined that the rest mode entry condition is met (Yes in S100), in S110, the processor 150 may determine whether the user agrees to enter the rest mode. The processor 150 may output a message for querying whether the user agrees to enter the rest mode through a user interface 120. When the user identifies the query message output through the user interface 120 and enters whether he or she agrees to enter the rest mode, the processor 150 may receive data according to a user input transmitted from the user interface 120. When the received data includes information indicating that the user agrees to enter the rest mode, the processor 150 may determine that the user agrees to enter the rest mode. When the received data includes information indicating that the user does not agree to enter the rest mode, the processor 150 may determine that the user does not agree to enter the rest mode.

When it is determined that the rest mode entry condition is not met (No in S120), in S120, the processor 150 may determine whether the user selects to enter the rest mode. The processor 150 may identify whether a control command (or data) to instruct to enter the rest mode is received from the user interface 120. When it is identified that the control command to instruct to enter the rest mode is received from the user interface 120, the processor 150 may determine that the user selects to enter the rest mode. Meanwhile, when it is identified that the control command to instruct to enter the rest mode is not received from the user interface 120, the processor 150 may determine that the user does not select to enter the rest mode.

When it is determined that the user does not agree to enter the rest mode (No in S110) or when the user does not select to enter the rest mode (No in S120), the processor 150 may return to S100.

When it is determined that the user agrees to enter the rest mode (Yes in S110) or when it is determined that the user selects to enter the rest mode (Yes in S120), in S130, the processor 150 may determine whether to enter the while-driving-rest mode based on the user input (or the user selection. The processor 150 may determine whether to enter the while-driving-rest mode based on the selection of the user for an in-vehicle rest mode. The in-vehicle rest mode may be divided into a while-driving-rest mode, an after-parking-rest mode, and the like.

When it is determined to enter the rest mode (Yes in S130), in S140, the processor 150 may perform vehicle control for a while-driving rest. After entering the while-driving-rest mode, the processor 150 may perform vehicle control such as electronics load optimization control, engine on or off control, and/or SOC control.

In S150, the processor 150 may perform vehicle control for the while-driving rest and may determine whether to end the rest mode. The processor 150 may perform vehicle control for the while-driving rest and may recognize a user state using the camera 111, the brain wave sensor 112, and/or the like. The processor 150 may determine whether to end the rest mode based on the recognized user state. For example, when the fatigue of the user, which is recognized by the camera 111, the brain wave sensor 112, and/or the like, is less than or equal to the predetermined reference value, the processor 150 may determine to end the rest mode. Furthermore, when a control command to instruct to end the rest mode is received from the user interface 120, the processor 150 may determine to end the rest mode. When it is determined to end the rest mode, the processor 150 may perform vehicle control for an in-vehicle rest.

When it is determined not to enter the while-driving-rest mode (No in S130), in S160, the processor 150 may perform vehicle control for preparing to enter the after-parking-rest mode. In other words, when it is determined to enter the after-parking-rest mode in the in-vehicle rest mode based on a user input received from the user interface 120 in S130, the processor 150 may perform vehicle control for preparing to enter the after-parking-rest mode. After entering the preparation mode for entering the after-parking-rest mode, the processor 150 may perform vehicle control, such as electronics load optimization control, air conditioning control, and/or SOC control.

In S170, the processor 150 may determine whether the vehicle arrives at a resting place. The processor 150 may determine whether the vehicle arrives at the resting place using AVN 148. The AVN 148 may calculate a current location of the vehicle using a signal transmitted from a satellite. The AVN 148 may compare the calculated current location of the vehicle with a location of the resting place set to the destination to determine whether the vehicle arrives at the resting place. The AVN 148 may transmit the result of determining whether the vehicle arrives at the resting place to the processor 150. The processor 150 may determine whether the vehicle arrives at the resting place based on the determined result transmitted from the AVN 148. The resting place may be an available parking place, which may be a resting space when the user is able to take an after-parking rest, for example, a sleep shelter and/or a rest area.

While it is determined that the vehicle arrives at the resting place (Yes in S170), in S180, the processor 150 may perform vehicle control for an after-parking rest. After entering the after-parking-rest mode, the processor 150 may perform vehicle control, such as electronics load optimization control, SOC control, and/or engine on and off optimization control.

In S190, the processor 150 may perform vehicle control for the after-parking rest and may determine whether to end the rest. For example, the processor 150 may determine a user state by means of an analysis of an image and/or a brain wave obtained by the camera 111, the brain wave sensor 112, and/or the like. The processor 150 may determine whether to end the rest based on the determined user state. For example, when the user state switches from a sleep state to a wake-up state (Yes in S190), the processor 150 may determine to end the rest. When it is determined to end the rest, the processor 150 may end the vehicle control for the after-parking rest.

Figure 5:
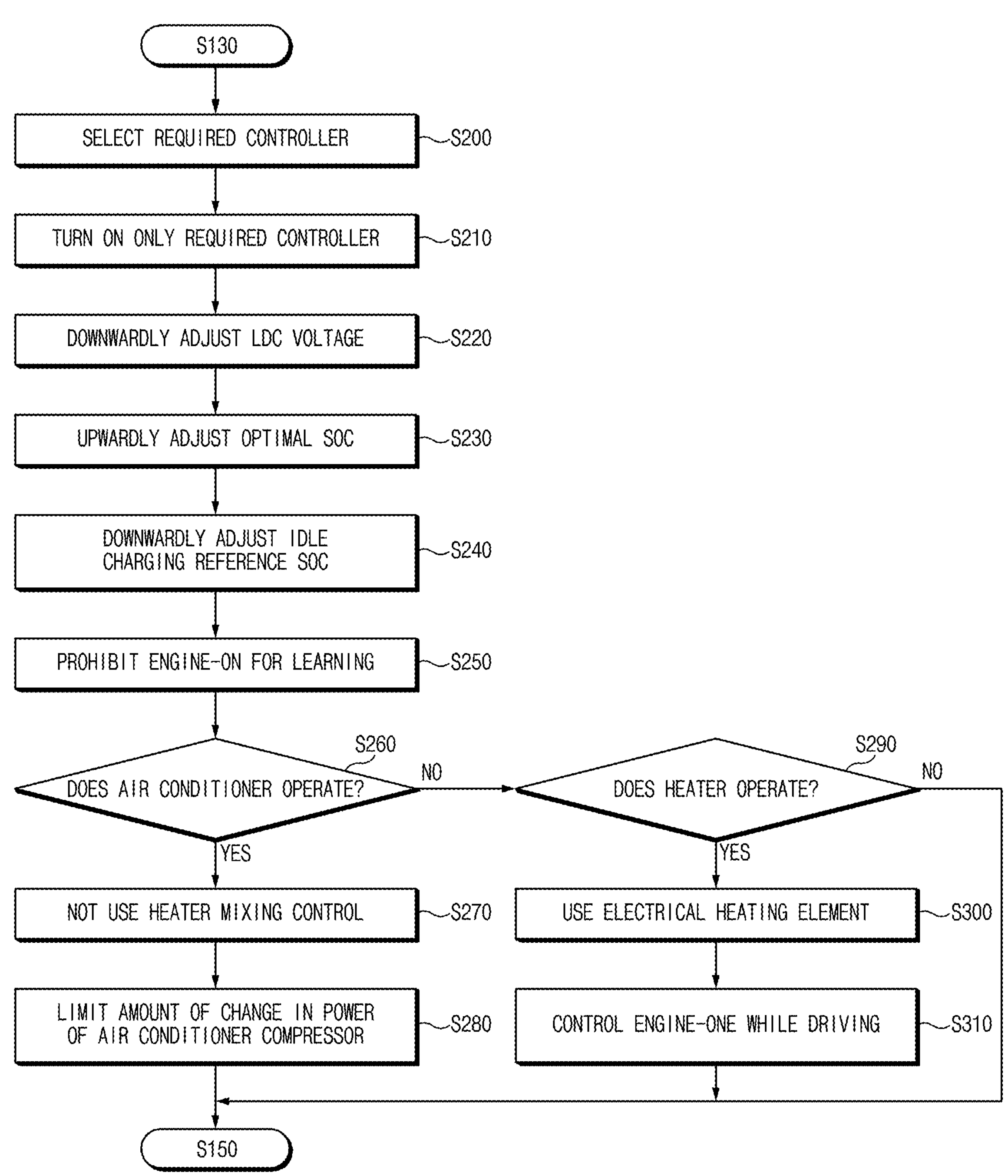
FIG. 5 is a flowchart illustrating a vehicle control method for a while-driving rest according to embodiments of the present disclosure.

FIG. 5 is a flowchart illustrating a vehicle control method for a while-driving rest according to embodiments of the present disclosure.

In S200, a processor 150 may select an essential controller for maintaining a while-driving-rest mode. Herein, the essential controller may be a controller essentially required to maintain an environment in the while-driving-rest mode (or a resting environment while driving).

In S210, the processor 150 may turn on (or operate) only the selected essential controller. The processor 150 may turn off (or stop) the remaining controllers, which are not selected as the essential controllers among controllers 140 loaded into a vehicle. For example, the processor 150 may turn off an unnecessary electronics load, such as a cluster, except for essential controllers, such as an HCU 141, an MCU 142, a BMS 143, an LDC 144, an EMS 145, an air conditioning controller 146, a BCM 147, and AVN 148.

In S220, the processor 150 may downwardly adjust an LDC voltage (i.e., an output voltage of the LDC 144). The LDC 144 may drive at low power of a level in which the current state of the low voltage battery is able to be maintained under an instruction of the processor 150 and may perform SOC defense control of a high voltage battery. In other words, when the voltage of the low voltage battery has a normal level (e.g., typically 12.1 V or more), the LDC 144 may perform control in which the high voltage battery is not used to a maximum.

In S230, the processor 150 may upwardly adjust an optimal SOC. The processor 150 may upwardly adjust an optimal SOC area to prevent an engine 10 from being turned on (or started) while stopped or when driving at a low speed. Because the processor 150 upwardly adjusts the optimal SOC area of the high voltage battery, it may suppress that the engine 10 is turned on although the power of the high voltage battery is consumed.

In S240, the processor 150 may downwardly adjust an idle charging reference SOC. The processor 150 may downwardly adjust a reference SOC which is a determination criterion for determining whether idle charging is performed to minimize engine-on due to being idle.

In S250, the processor 150 may prohibit engine-on for learning executed while the vehicle is operating. The processor 150 may limit engine operation for engine learning, engine clutch learning, and/or the like which is executed when the vehicle is stopped or while an electric vehicle (EV) is driving. The processor 150 may limit learning in a while-driving-rest mode and may perform learning in a next drive cycle. Because the processor 150 prohibits control for turning on the engine 10 for learning while stopped in the while-driving-rest mode, it may suppress vehicle vibration and noise due to engine-on in the stop state.

In S260, the processor 150 may determine whether an air conditioner operates. The processor 150 may identify whether the air conditioner operates through communication with the air conditioning controller 146.

When it is determined that the air conditioner operates (Yes in S260), in S270, the processor 150 may not use heater mixing control. The heater mixing control may refer to operating and controlling a heater when a condenser temperature decreases to a predetermined temperature or less when the air conditioner operates. Although the air conditioner is operating in the while-driving-rest mode and the condenser temperature decreases to the predetermined temperature or less, the processor 150 may control the air conditioning controller 146 to minimize the heater mixing control and suppress engine-on.

In S280, the processor 150 may limit an amount of change in power of an air conditioner compressor. The processor 150 may limit the amount of change in power of the air conditioner compressor to a predetermined limit value to reduce an air conditioner load. For example, the processor 150 may limit the amount of change in power (or an amount of fluctuation in power) of the air conditioner compressor to 10 W/100 ms. The processor 150 may minimize power consumption of the high voltage battery (or an air conditioner power loss) by limiting the amount of change in power of the air conditioner compressor.

When it is determined that the air conditioner does not operate (No in S260), in S290, the processor 150 may determine whether the heater operates. The processor 150 may identify whether the heater operates through communication with the air conditioning controller 146.

When it is determined that the heater operates (Yes in S290), in S300, the processor 150 may use an electrical heating element. Although the indoor temperature of the vehicle is less than a setting temperature, the processor 150 may adjust the indoor temperature of the vehicle by maximally using the electrical heating element, such as a TPC heater. Furthermore, although a coolant temperature decreases to less than a predetermined reference water temperature while stopped, the processor 150 may suppress engine-on and may turn on the engine 10 while driving, thus ensuring a heat source.

In S310, the processor 150 may perform engine-on control while driving. The processor 150 may control the EMS 145 to perform the engine-on control while driving.

Figure 6:
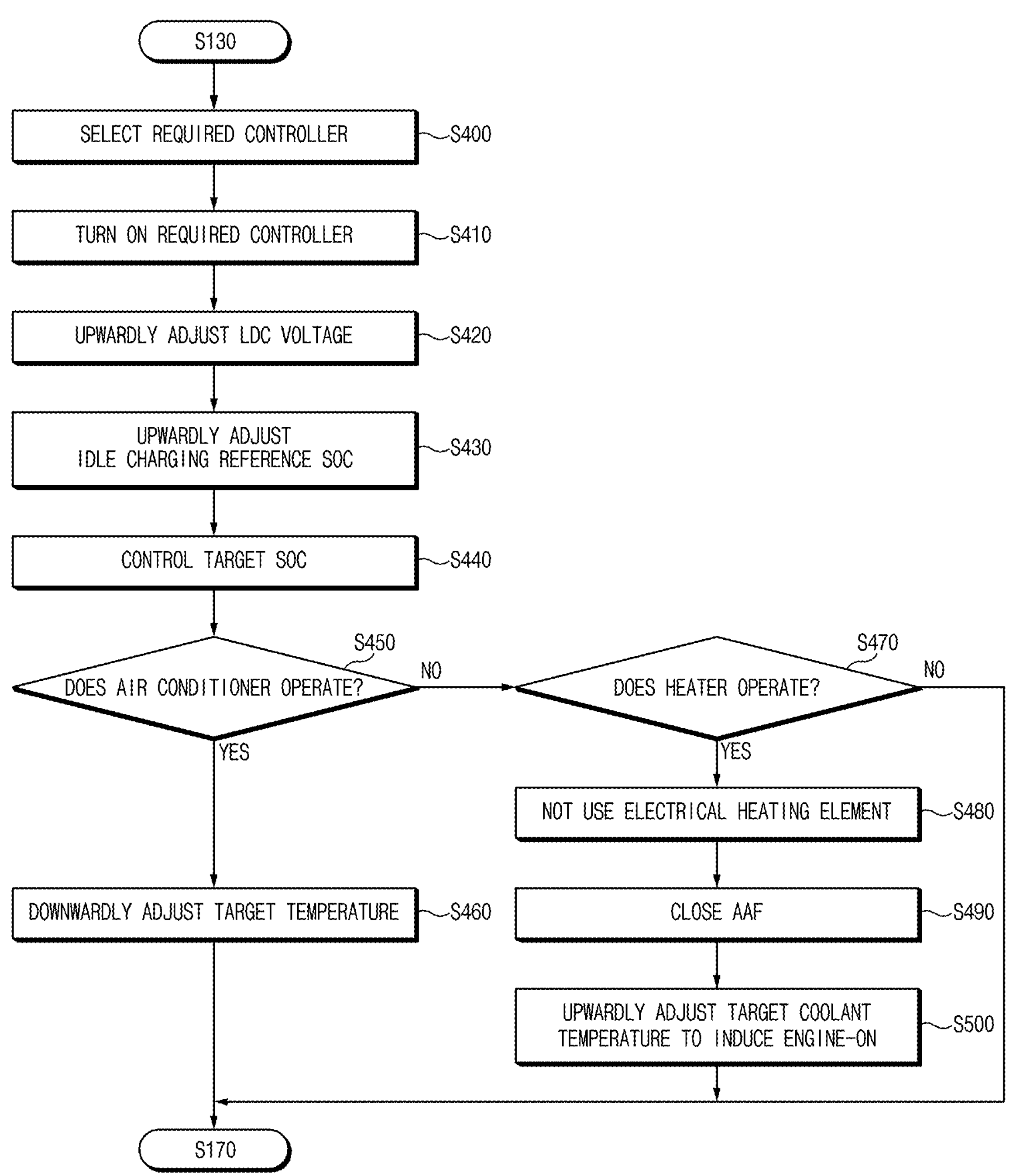
FIG. 6 is a flowchart illustrating a vehicle control method for preparing to enter an after-parking-rest mode according to embodiments of the present disclosure.

FIG. 6 is a flowchart illustrating a vehicle control method for preparing to enter an after-parking-rest mode according to embodiments of the present disclosure.

In S400, a processor 150 may select an essential controller for maintaining a preparation mode for entering the after-parking-rest mode. Herein, the essential controller may be a controller essentially required to maintain the preparation mode (or a preparation environment) for entering the after-parking-rest mode.

In S410, the processor 150 may turn on (or operate) only the selected essential controller. The processor 150 may turn off (or stop) the remaining controllers, which are not selected as the essential controllers among controllers 140 loaded into a vehicle. For example, the processor 150 may turn off an unnecessary electronics load, such as a cluster, an HUD, and an ambient light, except for essential controllers, such as an HCU 141, an MCU 142, a BMS 143, an LDC 144, an EMS 145, an air conditioning controller 146, a BCM 147, and AVN 148.

In S420, the processor 150 may upwardly adjust an LDC voltage (i.e., an output voltage of the LDC 144). The LDC 144 may drive at high power to maintain an SOC of the low voltage battery at a predetermined reference level or more when parking under an instruction of the processor 150 and may charge the low voltage battery to a maximum.

In S430, the processor 150 may upwardly adjust an idle charging reference SOC. Because the processor 150 may upwardly adjust the reference SOC, which is a determination criterion for determining whether idle charging is performed to induce engine-on, it may minimize that the SOC of the high voltage battery is reduced. The idle charging may be defined as a mode for operating the engine 10 and charging the high voltage battery to maintain the SOC of the high voltage battery as the reference SOC or more when the SOC of the high voltage battery is less than the reference SOC.

In S440, the processor 150 may perform target SOC control. When the battery SOC does not reach the target SOC by means of the target SOC control, the processor 150 may induce engine-on and may charge the battery by means of low SOC area control. The low SOC area control may be defined as control for allowing the engine 10 to actively intervene such that the battery SOC reaches an optimal SOC area, when the battery is discharged in a situation where the battery SOC is located in a low area L.

In S450, the processor 150 may determine whether an air conditioner operates. The processor 150 may identify whether the air conditioner operates through communication with the air conditioning controller 146.

In S460, the processor 150 may downwardly adjust a target temperature when it is determined that the air conditioner operates (Yes in S450). At this time, the processor 150 may adjust the target temperature of the air conditioner to be lower than a temperature set by the user. As a result, the processor 150 may sufficiently cool the interior of the vehicle such that the user does not feel hot when resting (or sleeping) and may minimize air conditioner usage after parking, thus ensuring the SOC of the high voltage battery.

When it is determined that the air conditioner does not operate (No in S450), in S470, the processor 150 may determine whether a heater operates. The processor 150 may identify whether the heater operates through communication with the air conditioning controller 146.

When it is determined that the heater operates (Yes in S470), in S480, the processor 150 may not use an electrical heating element. The processor 150 may stop heating performed by the electrical heating element when operating the heater. In other words, the processor 150 may minimize the use of the PTC heater to minimize power consumption of an electronics load.

In S490, the processor 150 may control to close an active air flap (AAF) to minimize cooling of a coolant. The AAF may be a device, which manages the heat of an engine room. When the coolant temperature increases, the AAF may be open to increase the cooling efficiency of the coolant through air suction. When the coolant temperature decreases, the AAF may be closed to reduce air resistance to increase fuel efficiency.

In S500, the processor 150 may upwardly adjust a target coolant temperature to induce engine-on. When the coolant temperature decreases, control for turning on the engine 10 to increase the coolant temperature is required. However, turning on the engine 10 while the user rests (e.g., sleeps) is able to disturb the rest of the user, the processor 150 may increase a target coolant temperature to induce the engine-on to sufficiently ensure a coolant temperature before parking.

According to the embodiment described above, because vehicle control for preparing to enter the after-parking-rest mode is to increase the SOCs of the high voltage battery and the low voltage battery while the vehicle is driving to a resting place and perform air conditioning control for a pleasant resting environment, it may be to maintain an optimal resting state when entering the after-parking-rest mode.

Figure 7:
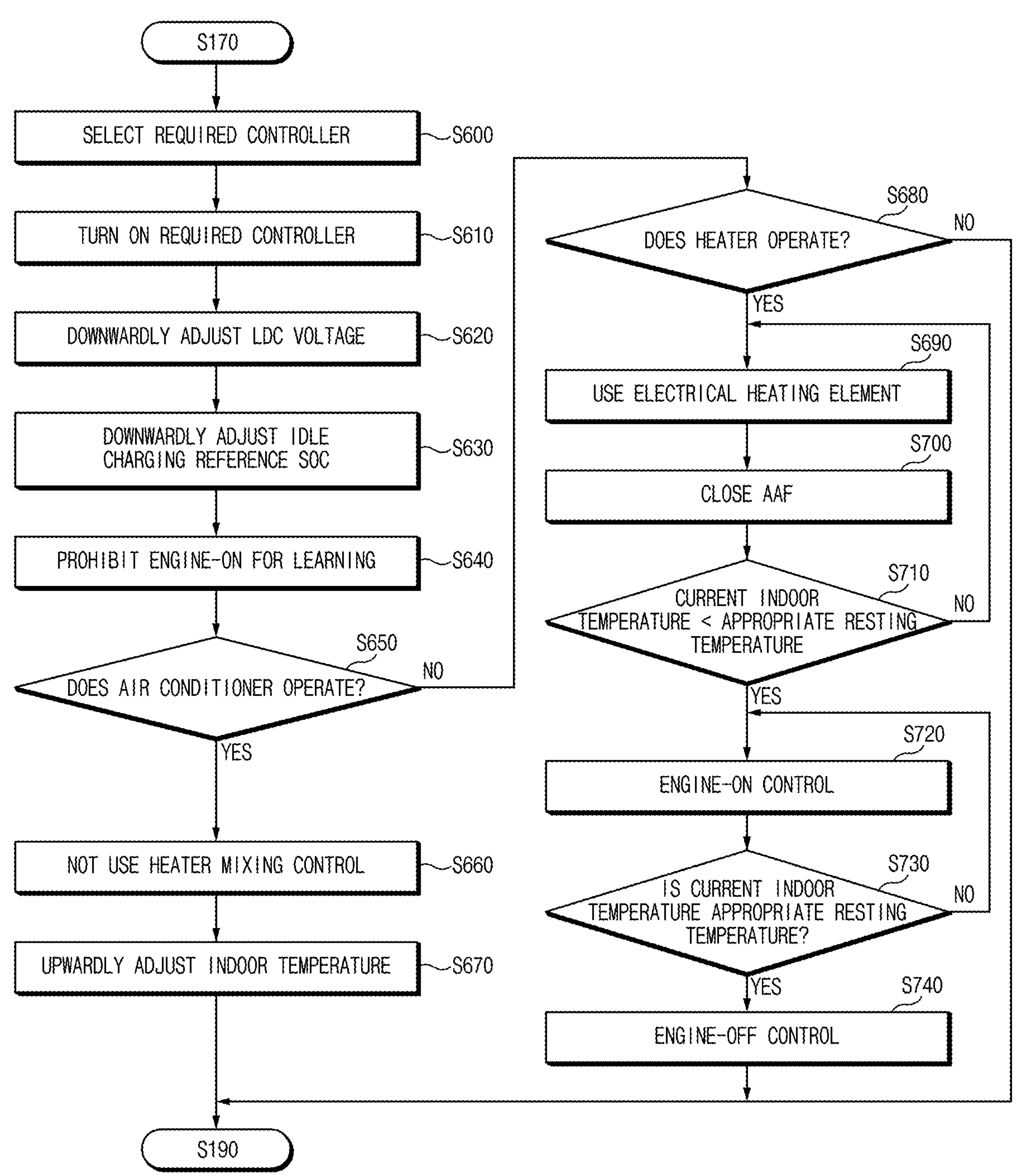
FIG. 7 is a flowchart illustrating a vehicle control method for an after-parking rest according to embodiments of the present disclosure.

FIG. 7 is a flowchart illustrating a vehicle control method for an after-parking rest according to embodiments of the present disclosure.

In S600, a processor 150 may select an essential controller for maintaining an after-parking-rest mode. Herein, the essential controller may be a controller essentially required to maintain an environment in the after-parking-rest mode (or a resting environment after parking).

In S610, the processor 150 may turn on (or operate) only the selected essential controller. The processor 150 may turn off (or stop) the remaining controllers, which are not selected as essential controllers among controllers 140 loaded into a vehicle. For example, the processor 150 may turn off an unnecessary electrical device, such as a cluster, AVN 148, and an ambient light, except for the essential controllers, such as an HCU 141, an MCU 142, a BMS 143, an LDC 144, an EMS 145, an air conditioning controller 146, and a BCM 147.

In S620, the processor 150 may downwardly adjust an output voltage of the LDC 144. The LDC 144 may drive at low power of a level in which the current state of the low voltage battery is able to be maintained under an instruction of the processor 150. The LDC 144 may perform SOC defense control of a high voltage battery. In other words, when the voltage of the low voltage battery has a normal level (e.g., typically 12.1 V or more), the LDC 144 may perform control in which the high voltage battery is not used to a maximum.

In S630, the processor 150 may downwardly adjust an idle charging reference SOC. The processor 150 may downwardly adjust the reference SOC, which is a determination criterion for determining whether idle charging is performed to minimize that the engine 10 is turned on due to being idle. The idle charging may be defined as a mode for operating the engine 10 and charging the high voltage battery to maintain the SOC of the high voltage battery as the reference SOC or more when the SOC of the high voltage battery is less than the reference SOC.

In S640, the processor 150 may prohibit engine-on for learning. The processor 150 may limit an engine operation for engine learning, engine clutch learning, and/or the like, which are/is executed when the vehicle is stopped or while an EV is driving. The processor 150 may limit learning in a while-driving-rest mode and may perform learning in a next drive cycle. Because the processor 150 prohibits control for turning on the engine 10 for learning while stopped in the while-driving-rest mode, it may suppress vehicle vibration and noise due to engine-on in the stop state.

In S650, the processor 150 may determine whether an air conditioner operates. The processor 150 may identify whether the air conditioner operates through communication with the air conditioning controller 146.

When it is determined that the air conditioner operates (Yes in S650), in S660, the processor 150 may not use heater mixing control. The heater mixing control may refer to operating and controlling of a heater when a condenser temperature decreases to a predetermined temperature or less when the air conditioner operates. Although the air conditioner is operating in the while-driving-rest mode and the condenser temperature decreases to the predetermined temperature or less, the processor 150 may control the air conditioning controller 146 to minimize the heater mixing control and suppress engine-on. Because the user slowly recognizes a change in temperature in a resting state (e.g., a sleep state), there may be less need to perform fast temperature control.

In S670, the processor 150 may upwardly adjust an indoor temperature of a vehicle. At this time, the processor 150 may upwardly control the indoor temperature with regard to a decrease in body temperature during rest.

When it is determined that the air conditioner does not operate (No in S650), in S680, the processor 150 may determine whether the heater operates. The processor 150 may identify whether the heater operates through communication with the air conditioning controller 146.

When it is determined that the heater operates (Yes in S680), in S690, the processor 150 may use an electrical heating element. Although the indoor temperature of the vehicle is less than a setting temperature, the processor 150 may adjust the indoor temperature of the vehicle by maximally using the electrical heating element, such as a TPC heater. Furthermore, although the coolant temperature decreases while stopped, the processor 150 may suppress engine-on and may ensure a heat source by means of engine-on while driving.

In S700, the processor 150 may close an AAF to minimize the cooling of a coolant. The AAF may be a device, which manages the heat of an engine room. When the coolant temperature increases, the AAF may be open to increase the cooling efficiency of the coolant through air suction. When the coolant temperature decreases, the AAF may be closed to reduce air resistance to increase fuel efficiency.

In S710, the processor 150 may determine whether the current indoor temperature is less than a predetermined appropriate resting temperature. The processor 150 may measure the current indoor temperature of the vehicle using temperature sensors 113 and may compare the measured current indoor temperature with the appropriate resting temperature.

When it is determined that the current indoor temperature is less than the predetermined appropriate resting temperature (Yes in S710), in S720, the processor 150 may perform engine-on control. When the current indoor temperature is less than the predetermined appropriate resting temperature, the processor 150 may turn on the engine 10 to provide heating to the interior of the vehicle.

In S730, the processor 150 may determine whether the current indoor temperature reaches the appropriate resting temperature. The processor 150 may compare the current indoor temperature with an "appropriate resting temperature+$\alpha$". When the current indoor temperature is identical to the "appropriate resting temperature+$\alpha$" as a result of the comparison, the processor 150 may determine that the current indoor temperature reaches the appropriate resting temperature. A tolerance range may be hysteresis, which may be determined at a level of 10% of the appropriate resting temperature.

When it is determined that the current indoor temperature reaches the appropriate resting temperature (Yes in S730), in S740, the processor 150 may perform engine-off control. In other words, when the current indoor temperature reaches the appropriate resting temperature, the processor 150 may turn off the engine 10.

According to the embodiment described above, the vehicle control in the after-parking rest is to control the vehicle in an optimal state to rest while minimizing a factor which hinders a passenger from resting by means of optimal control for rest, which may prevent air conditioning control and engine-on.

Figure 8:
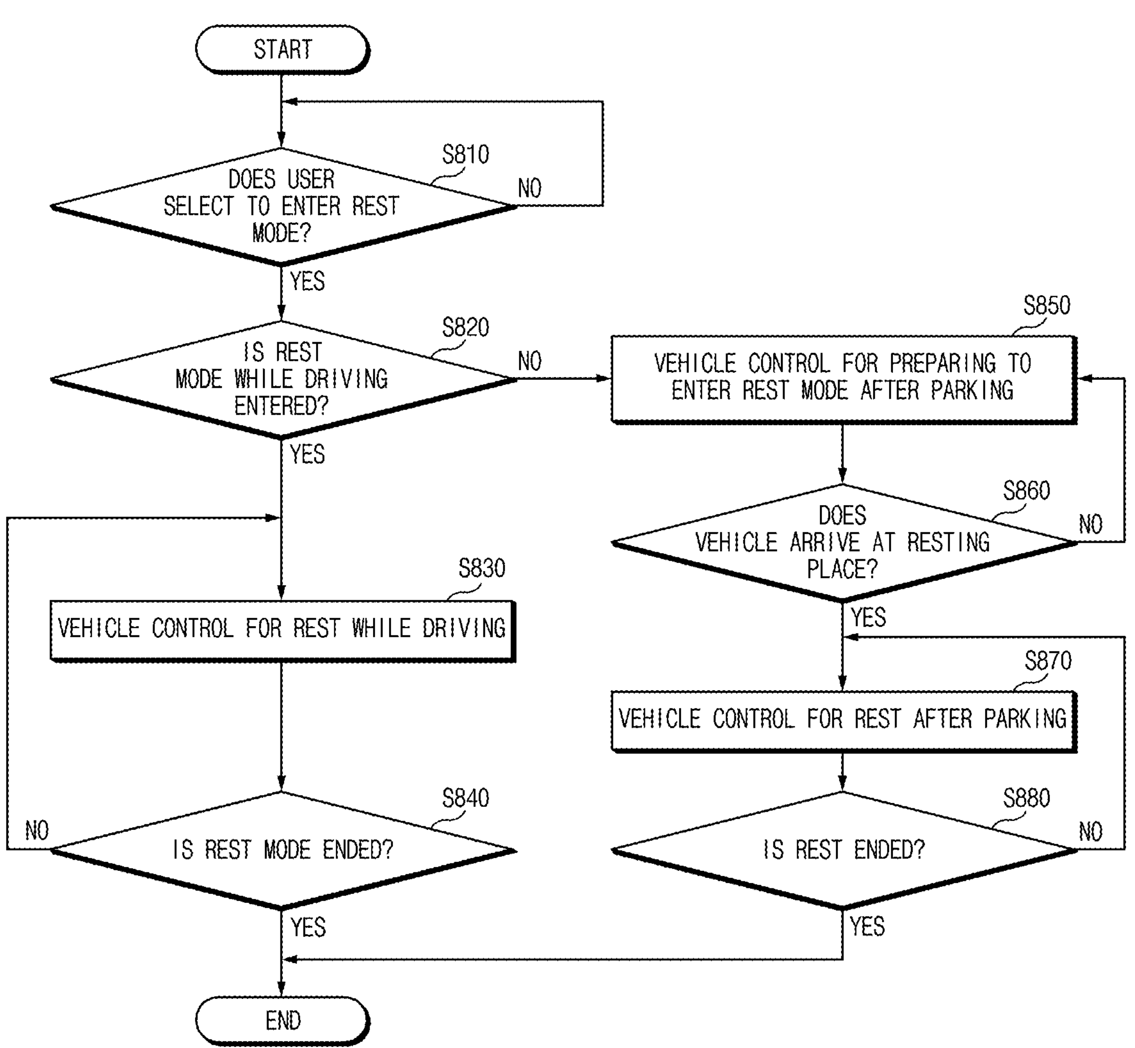
FIG. 8 is a flowchart illustrating a vehicle control method according to another embodiment of the present disclosure.

FIG. 8 is a flowchart illustrating a vehicle control method according to another embodiment of the present disclosure.

In S810, a processor 150 of a vehicle control apparatus 100 may determine whether a user selects to enter a rest mode. The processor 150 may identify whether a control command (or data) to instruct to enter the rest mode is received from a user interface 120. When it is identified that the control command to instruct to enter the rest mode is received from the user interface 120, the processor 150 may determine that the user selects to enter the rest mode. Meanwhile, when it is identified that the control command to instruct to enter the rest mode is not received from the user interface 120, the processor 150 may determine that the user does not select to enter the rest mode.

When it is determined that the user selects to enter the rest mode (Yes in S810), in S820, the processor 150 may determine whether to enter a while-driving-rest mode based on the user input (or the user selection. The processor 150 may determine whether to enter the while-driving-rest mode based on the selection of the user for an in-vehicle rest mode, which is received from the user interface 120. The in-vehicle rest mode may be divided into a while-driving-rest mode, an after-parking-rest mode, and the like.

When it is determined to enter the while-driving-rest mode (Yes in S820), in S830, the processor 150 may perform vehicle control for a while-driving rest. After entering the while-driving-rest mode, the processor 150 may perform vehicle control, such as electronics load optimization control, engine on or off control, and/or SOC control.

In S840, the processor 150 may perform vehicle control for the while-driving rest and may determine whether to end the rest mode. The processor 150 may perform vehicle control for the while-driving rest and may recognize a user state using a camera 111, a brain wave sensor 112, and/or the like. The processor 150 may determine whether to end the rest mode based on the recognized user state. For example, when the fatigue of the user, which is recognized by the camera 111, the brain wave sensor 112, and/or the like, is less than or equal to the predetermined reference value, the processor 150 may determine to end the rest mode. Furthermore, when a control command to instruct to end the rest mode is received from the user interface 120, the processor 150 may determine to end the rest mode. When it is determined to end the rest mode, the processor 150 may perform vehicle control for an in-vehicle rest.

When it is determined not to enter the while-driving-rest mode in S820 (No in S820), in S850, the processor 150 may perform vehicle control for preparing to enter the after-parking-rest mode. In other words, when it is determined to enter the after-parking-rest mode in the in-vehicle rest mode based on a user input received from the user interface 120 in S820, the processor 150 may perform vehicle control for preparing to enter the after-parking-rest mode. After entering the preparation mode for entering the after-parking-rest mode, the processor 150 may perform vehicle control such as electronics load optimization control, air conditioning control, and/or SOC control.

In S860, the processor 150 may determine whether the vehicle arrives at a resting place. The processor 150 may determine whether the vehicle arrives at the resting place using AVN 148. The AVN 148 may calculate a current location of the vehicle using a signal transmitted from a satellite. The AVN 148 may compare the calculated current location of the vehicle with a location of the resting place set to the destination to determine whether the vehicle arrives at the resting place. The AVN 148 may transmit the result of determining whether the vehicle arrives at the resting place to the processor 150. The processor 150 may determine whether the vehicle arrives at the resting place based on the determined result transmitted from the AVN 148. The resting place may be an available parking place, which may be a resting space when the user is able to take an after-parking rest, for example, a sleep shelter and/or a rest area.

While it is determined that the vehicle arrives at the resting place (Yes in S860), in S870, the processor 150 may perform vehicle control for an after-parking rest. After entering the after-parking-rest mode, the processor 150 may perform vehicle control such as electronics load optimization control, SOC control, and/or engine on and off optimization control.

In S880, the processor 150 may perform vehicle control for the after-parking rest and may determine whether to end the rest. For example, the processor 150 may determine a user state by means of an analysis of an image and/or a brain wave obtained by the camera 111, the brain wave sensor 112, and/or the like. The processor 150 may determine whether to end the rest based on the determined user state. For example, when the user state switches from a sleep state to a wake-up state, the processor 150 may determine to end the rest. When it is determined to end the rest, the processor 150 may end the vehicle control for the after-parking rest.

Embodiments of the present disclosure may control the vehicle to minimize a factor, which impedes the rest of the user in the vehicle, such that the passenger safely and comfortably rests in the vehicle.

Furthermore, embodiments of the present disclosure may minimize idle charging to induce the passenger to rest, thus improving fuel efficiency.

Hereinabove, although the present disclosure has been described with reference to embodiments and the accompanying drawings, the present disclosure is not limited thereto. However, the present disclosure may be variously modified and altered by those having ordinary skill in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed based on the accompanying claims, and all the technical ideas within the scope equivalent to the claims should be included in the scope of the present disclosure.

What is claimed is:

1. A vehicle control apparatus, comprising:
- a detector configured to obtain user information; and
- a processor connected to the detector and configured to:
  - determine a user state based on the user information obtained by the detector while a vehicle is traveling,
  - determine whether a rest mode entry condition is satisfied based on the user state,
  - determine an in-vehicle rest mode based on a user input received from a user interface, in response to a determination that the rest mode entry condition is satisfied, and
  - perform vehicle control corresponding to the in-vehicle rest mode, wherein the processor is further configured to:
  - enter a preparation mode for entering an after-parking-rest mode, in response to a determination that the in-vehicle rest mode is the after-parking-rest mode; and
  - upwardly adjust an output voltage of a low voltage DC-DC converter to charge a low voltage battery by using a high voltage battery.

2. The vehicle control apparatus of claim 1, wherein the processor is configured to:
- analyze an image captured by a camera to determine fatigue of a user; and
- determine whether the user needs to rest based on the fatigue of the user.

3. The vehicle control apparatus of claim 1, wherein the processor is configured to:
- analyze a brain wave signal measured by a brain wave sensor to determine fatigue of a user; and
- determine whether the user needs to rest based on the fatigue of the user.

4. The vehicle control apparatus of claim 1, wherein the processor is configured to:
- select and turn on an essential controller for electronics load optimization when entering the in-vehicle rest mode; and
- turn off remaining controllers except for the essential controller among controllers loaded into a vehicle.

5. The vehicle control apparatus of claim 1, wherein the in-vehicle rest mode is divided into a while-driving-rest mode and an after-parking-rest mode based on a rest mode entry time point and the processor is configured to downwardly adjust an output voltage of the low voltage DC-DC converter to suppress power consumption of the high voltage battery, in response to a determination that the in-vehicle rest mode is a while-driving-rest mode.

6. The vehicle control apparatus of claim 5, wherein the processor is configured to:

upwardly adjust an optimal state of charge (SOC) area determined with regard to efficiency of the high voltage battery;

downwardly adjust a reference SOC being a determination criterion for determining whether idle charging is performed; and limit turning-on of an engine for learning executed while the vehicle is operating.

7. The vehicle control apparatus of claim 5, wherein the processor is configured to:

limit operation of a heater, in response to a determination that a condenser temperature decreases to or below a predetermined temperature when an air conditioner operates;

limit an amount of change in power of an air conditioner compressor perform heating by using an electrical heating element, when a heater operates; and limit heating performed by an engine.

8. The vehicle control apparatus of claim 1, wherein the processor is configured to:

upwardly adjust a reference SOC being a determination criterion for determining whether idle charging is performed; and turn on an engine to charge the high voltage battery, in response to a determination that an SOC of the high voltage battery is less than a target SOC.

9. The vehicle control apparatus of claim 1, wherein the processor is configured to adjust a target temperature to be lower than a predetermined setting temperature, when an air conditioner operates.

10. The vehicle control apparatus of claim 1, wherein the processor is configured to:

stop heating performed by an electrical heating element, when a heater operates;

close an active air flap (AAF) to minimize cooling of an engine coolant; and upwardly adjust a target coolant temperature to turn on an engine.

11. The vehicle control apparatus of claim 1, wherein the processor is configured to:

determine whether the vehicle arrives at a predetermined resting place;

enter the after-parking-rest mode, in response to a determination that the vehicle arrives at the predetermined resting place;

downwardly adjust an output voltage of the low voltage DC-DC converter;

downwardly adjust a reference SOC being a determination criterion for determining whether idle charging is performed; and limit turning-on of an engine for learning executed while the vehicle is operating.

12. The vehicle control apparatus of claim 11, wherein the processor is configured to:

limit operation of a heater, in response to a determination that a condenser temperature decreases to or below a predetermined temperature, when an air conditioner operates; and upwardly adjust an indoor temperature of the vehicle.

13. The vehicle control apparatus of claim 11, wherein the processor is configured to:

perform heating by using an electrical heating element, when a heater operates;

close an AAF to minimize cooling of an engine coolant;

determine whether an indoor temperature of the vehicle is less than a predetermined appropriate resting temperature;

turn on an engine to perform heating, in response to a determination that the indoor temperature of the vehicle is less than the predetermined appropriate resting temperature; and turn off the engine, in response to a determination that the indoor temperature of the vehicle reaches the predetermined appropriate resting temperature.

14. A vehicle control method, comprising:

determining a user state based on user information obtained by a detector;

determining whether a rest mode entry condition is satisfied based on the user state;

determining an in-vehicle rest mode based on a user input received from a user interface, in response to a determination that the rest mode entry condition is satisfied;

performing vehicle control corresponding to the in-vehicle rest mode;

entering a preparation mode for entering an after-parking-rest mode, in response to determining that the in-vehicle rest mode is the after-parking-rest mode; and upwardly adjusting an output voltage of a low voltage DC-DC converter to charge a low voltage battery by using a high voltage battery.

15. The vehicle control method of claim 14, wherein the performing of the vehicle control corresponding to the in-vehicle rest mode includes:

performing vehicle control for a while-driving rest while driving, if in response to a determination that the in-vehicle rest mode is determined as a rest mode while driving a while-driving-rest mode.

16. The vehicle control method of claim 15, wherein the performing of the vehicle control for the rest while the vehicle is traveling driving includes:

downwardly adjusting an output voltage of the low voltage DC-DC converter to suppress power consumption of the high voltage battery.

17. The vehicle control method of claim 16, wherein the performing of the vehicle control for the rest while the vehicle is traveling driving includes:

upwardly adjusting an optimal SOC area determined with regard to efficiency of the high voltage battery;

downwardly adjusting a reference SOC which is being a determination criterion for determining whether idle charging is performed; and limiting turning-on of an engine for learning executed while a vehicle is operating.

18. The vehicle control method of claim 16, wherein the performing of the vehicle control for the rest while driving the vehicle is traveling includes:

limiting operation of a heater, although in response to a determination that a condenser temperature decreases to or below a predetermined temperature or less, when an air conditioner operates; and limiting an amount of change in power of an air conditioner compressor.

19. The vehicle control method of claim 16, wherein the performing of the vehicle control for the rest while the vehicle is traveling driving includes:

performing heating by using an electrical heating element, when a heater operates; and performing heating by using an engine, only while the vehicle is traveling driving.

* * * * *